United States Patent
Li et al.

(10) Patent No.: US 12,019,144 B2
(45) Date of Patent: Jun. 25, 2024

(54) FREQUENCY DIVISION MULTIPLEXING WITH POLYPHASE SHIFTERS

(71) Applicant: Aptiv Technologies AG, Schaffhausen (CH)

(72) Inventors: Zhengzheng Li, Agoura Hills, CA (US); Christopher D. Gianelli, Michigan City, IN (US)

(73) Assignee: Aptiv Technologies AG, Schaffhausen (CH)

( * ) Notice: Subject to any disclaimer, the term of this patent is extended or adjusted under 35 U.S.C. 154(b) by 274 days.

(21) Appl. No.: 17/383,573

(22) Filed: Jul. 23, 2021

(65) Prior Publication Data
US 2022/0283284 A1    Sep. 8, 2022

Related U.S. Application Data

(60) Provisional application No. 63/156,480, filed on Mar. 4, 2021.

(51) Int. Cl.
*G01S 13/58*    (2006.01)
*G01S 13/931*   (2020.01)
*H04J 1/02*     (2006.01)

(52) U.S. Cl.
CPC ............ *G01S 13/58* (2013.01); *G01S 13/931* (2013.01); *H04J 1/02* (2013.01)

(58) Field of Classification Search
CPC ........... G01S 13/58; G01S 13/931; H04J 1/02
(Continued)

(56) References Cited

U.S. PATENT DOCUMENTS

| 7,430,254 B1 | 9/2008 | Anderson |
| 7,474,262 B2 | 1/2009 | Alland |

(Continued)

FOREIGN PATENT DOCUMENTS

| EP | 3598170 A1 | 1/2020 |
| EP | 3835810 A1 | 6/2021 |

OTHER PUBLICATIONS

"Extended European Search Report", EP Application No. 22150642.1, dated Jun. 27, 2022, 6 pages.

(Continued)

*Primary Examiner* — Bo Fan
(74) *Attorney, Agent, or Firm* — Harness, Dickey & Pierce, P.L.C.

(57) ABSTRACT

This document describes techniques and systems for frequency division multiplexing (FDM) with polyphase shifters. A radar system can include transmitters, receivers, polyphase shifters, and a processor. The transmitters emit electromagnetic (EM) signals in an FDM scheme, and the receivers detect EM signals reflected by objects. The received EM signals include multiple channels. The processor controls the polyphase shifters to introduce phase shifts to the EM signals. The processor can also divide a Doppler-frequency spectrum of the received EM signals into multiple sectors representing a respective frequency range. Each channel is associated with a respective sector. The processor can determine, using non-coherent integration across the sectors, potential detections of the objects, including aliased and actual detections. The processor can then determine the actual detections. In this way, the described FDM techniques with polyphase shifters can resolve Doppler ambiguities in received EM signals.

18 Claims, 19 Drawing Sheets

(58) Field of Classification Search
USPC .................................. 342/104, 125, 357.25
See application file for complete search history.

(56) References Cited

U.S. PATENT DOCUMENTS

| | | | |
|---|---|---|---|
| 9,182,476 | B2 | 11/2015 | Wintermantel |
| 10,917,162 | B2* | 2/2021 | Smart ................ H04B 7/18515 |
| 11,513,187 | B2 | 11/2022 | Stettiner et al. |
| 11,709,247 | B2 | 7/2023 | Heller |
| 2017/0160380 | A1 | 6/2017 | Searcy et al. |
| 2018/0329054 | A1 | 11/2018 | Pokrass et al. |
| 2019/0377059 | A1 | 12/2019 | Kondo et al. |
| 2020/0025914 | A1 | 1/2020 | Li et al. |
| 2020/0049812 | A1 | 2/2020 | Jansen |
| 2020/0081110 | A1 | 3/2020 | Nam et al. |
| 2020/0191940 | A1* | 6/2020 | Wu ..................... H04B 7/0413 |
| 2020/0233076 | A1 | 7/2020 | Chen et al. |
| 2022/0283300 | A1 | 9/2022 | Li et al. |

OTHER PUBLICATIONS

"Extended European Search Report", EP Application No. 22150643.9, dated Jun. 27, 2022, 7 pages.

Buratti, et al., "New results on modular Golomb rulers, optical orthogonal codes and related structures", ARS Mathematica Contemporanea, vol. 20, No. 1, 2021, pp. 1-27.

"Extended European Search Report", EP Application No. 22200283.4, dated Aug. 18, 2023, 9 pages.

* cited by examiner

FREQUENCY DIVISION MULTIPLEXING WITH POLYPHASE SHIFTERS

CROSS-REFERENCE TO RELATED APPLICATION

This application claims the benefit under 35 U.S.C. 119(e) of U.S. Provisional Application No. 63/156,480, filed Mar. 4, 2021, the disclosure of which is incorporated by reference in its entirety herein.

BACKGROUND

Radar systems transmit and receive electromagnetic (EM) signals for detecting and tracking objects. In automotive applications, radar systems provide information about the vehicle's environment and can play an essential role in Advanced Driver Assistance Systems (ADAS). Highly automated systems generally require radar data with high resolution in range, Doppler, and angular dimensions. Popular approaches to achieve improved angular dimensions are multiple-input and multiple-output (MIMO) radar techniques that provide relatively large virtual arrays with reduced angular ambiguity. MIMO techniques, however, can provide inadequate Doppler discrimination.

SUMMARY

This document describes techniques and systems for frequency division multiplexing (FDM) with polyphase shifters. In some examples, a radar system for installation on a vehicle includes multiple transmitters, multiple receivers, multiple polyphase shifters, and a processor. The transmitters can transmit electromagnetic (EM) signals in an FDM scheme. The receivers can receive EM signals reflected by one or more objects that include multiple channels. The polyphase shifters can introduce at least three potential phase shifts to the transmitted EM signals, received EM signals, or both. The polyphase shifters are operably connected to the transmitters, receivers, or a combination of both. The processor can control the polyphase shifters to introduce phase shifts. The processor can also divide a Doppler-frequency spectrum of the received EM signals into multiple sectors representing a respective frequency range. Each channel is associated with a respective sector. The processor can determine, using non-coherent integration of the received EM signals across the sectors, potential detections of the objects. The processor can then determine the actual detections. In this way, the described FDM techniques with polyphase shifters can resolve Doppler ambiguities in received EM signals.

This document also describes methods performed by the above-summarized system and other configurations of the radar system set forth herein and means for performing these methods.

This Summary introduces simplified concepts related to enabling FDM techniques with polyphase shifters in a radar system, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of slow-time frequency division multiplexing with polyphase shifters are described in this document with reference to the following figures. The same numbers are often used throughout the drawings to reference like features and components:

FIGS. 3, 4-1, 4-2, 5-1, and 5-2 illustrate example conceptual diagrams of a radar system that uses FDM with polyphase shifters;

DETAILED DESCRIPTION

Overview

Figure 1:
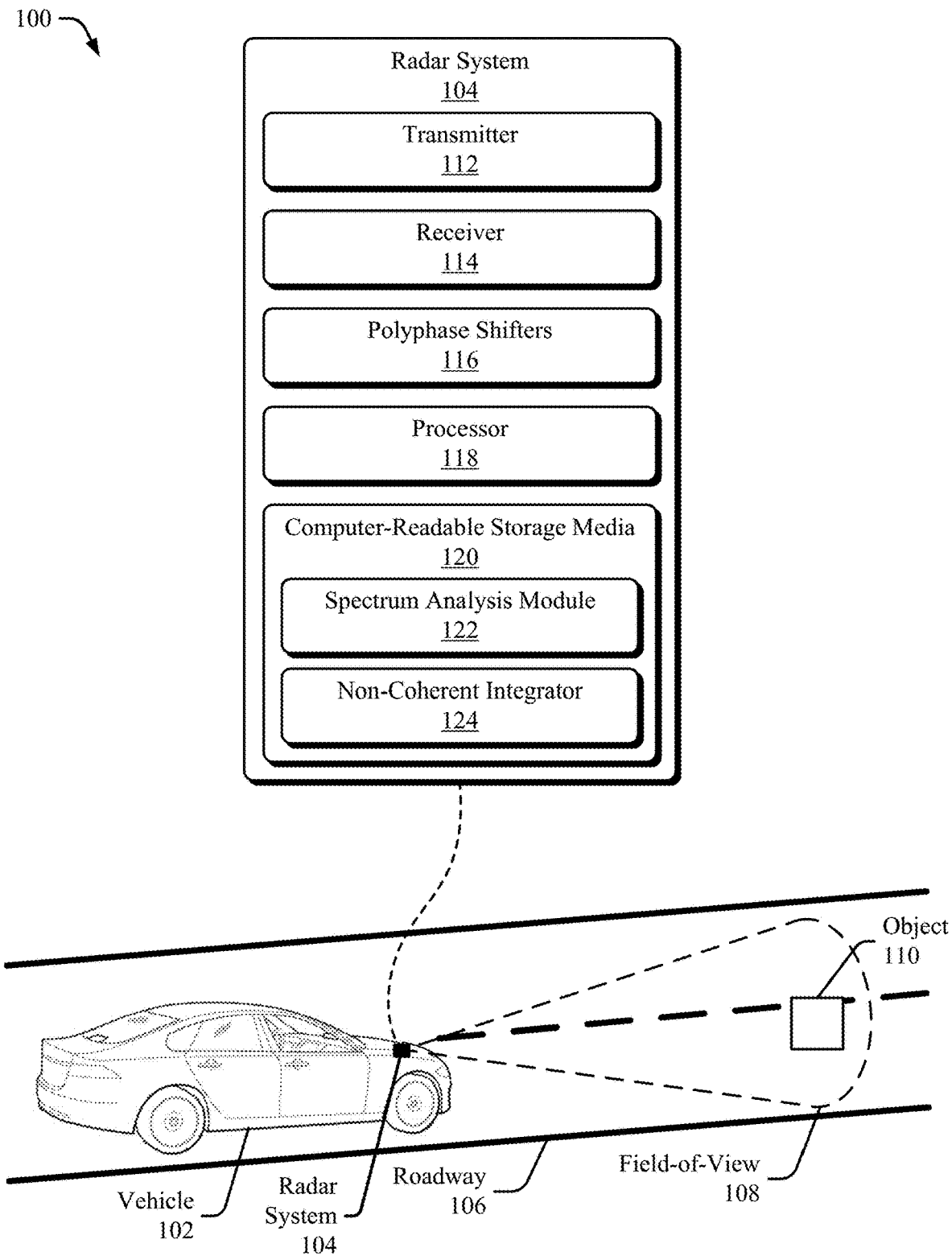
FIG. 1 illustrates an example environment in which a radar system can use FDM with polyphase shifters in accordance with techniques of this disclosure.

Radar systems can be configured as an important sensing technology that vehicle-based systems use to acquire information about the surrounding environment. For example, vehicle-based systems can use radar systems to detect objects in or near a roadway and, if necessary, take necessary actions (e.g., reduce speed, change lanes) to avoid a collision.

Radar systems generally include at least two antennas to transmit and receive radar (e.g., EM) signals. Many vehicle-based systems require high resolution in range, Doppler frequency, and angle. These systems also require accurate discrimination between multiple targets with similar ranges or Doppler frequencies. Design engineers often address these requirements by including more antenna channels in radar systems. For example, some automotive radar systems operate MIMO radars to increase the number of channels and improve angular resolution. A MIMO radar system with three transmit channels and four receive channels can form a virtual array (also referred to as a "synthetic array") of twelve channels. With additional channels, a MIMO radar system can operate with an improved angular resolution, relying on a flexible physical layout of inexpensive and possibly fewer hardware components than traditional non-MIMO radar systems.

MIMO radar systems generally use orthogonal waveforms to transmit and receive independent, orthogonal EM signals and identify or separate the different channels. Radar systems can implement orthogonal waveforms in various ways, including using time-division multiplexing (TDM), FDM, and code multiplexing (CM) techniques. However, each orthogonal waveform technique has associated benefits and weaknesses.

For example, FDM techniques generally place signals from transmit channels in different frequency bands by adding frequency offsets to the transmit signals. Such techniques generally operate in a fast-time (range) domain, introduce a range-dependent phase offset among channels, and reduce range coverage. FDM techniques can also require a higher sampling rate due to the increased intermediate-frequency bandwidth.

CM techniques can enable simultaneous transmission and operate in fast-time (e.g., within a chirp, range domain) and slow-time domains (e.g., chirp to chirp, Doppler domain). CM techniques generally recover a signal matching a current code by suppressing energy from other coded signals. The distributed EM energy left from the suppressed signals is generally considered residue or noise and limits the dynamic range of the radar system. A smaller dynamic range limits the radar system's ability to differentiate smaller objects from larger objects.

Some TDM techniques do not support simultaneous transmission. Instead, individual transmitters transmit sequentially, leading to less interference between transmit channels and a maximum degree of orthogonality. Such techniques, however, generally do not provide the signal-to-noise ratio benefits realized with simultaneous transmission (e.g., FDM and CM techniques) and can lead to Doppler ambiguity among channels.

Previously used techniques, including those described above, generally do not provide adequate discrimination among channels, leading to a smaller signal-to-noise ratio. In contrast, this document describes techniques and systems to provide a radar system that achieves simultaneous transmission using FDM techniques with polyphase shifters. In this way, the described techniques and systems support multiple transmitters transmitting simultaneously with accurate recovery and without Doppler ambiguity. For example, a vehicle's radar system includes multiple transmitters, multiple receivers, multiple polyphase shifters, and a processor. The transmitters can transmit EM signals in an FDM scheme. The receivers can receive EM signals reflected by one or more objects that include multiple channels. The polyphase shifters can introduce at least three potential phase shifts to the transmitted EM signals, received EM signals, or both. The polyphase shifters are operably connected to the transmitters, receivers, or a combination of both. The processor can control the polyphase shifters to introduce phase shifts. The processor can also divide a Doppler-frequency spectrum of the received EM signals into multiple sectors representing a respective frequency range. Each channel is associated with a respective sector. The processor can determine, using non-coherent integration of the received EM signals across the sectors, potential detections of the objects. The processor can then determine the actual detections. In this way, multiple transmitters transmitting simultaneously with accurate recovery and without Doppler ambiguity are supported. Accurate recovery is possible by avoiding interference among channels. The described FDM techniques avoid ambiguity by identifying each channel without additional information.

This example is just one example of the described techniques and systems of a radar system using slow-time frequency division multiplexing with polyphase shifters. This document describes other examples and implementations.

Operating Environment

FIG. 1 illustrates an example environment 100 in which a radar system 104 can use FDM with polyphase shifters 116 in accordance with the techniques of this disclosure. In the depicted environment 100, the radar system 104 is mounted to, or integrated within, a vehicle 102 traveling on a roadway 106. Within a field-of-view 108, the radar system 104 can detect one or more objects 110 in the vicinity of the vehicle 102.

The radar system 104 can detect one or more objects 110 in the vicinity of the vehicle 102. Although illustrated as a sedan, the vehicle 102 can represent other types of motorized vehicles (e.g., a car, an automobile, a truck, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 104 to any moving platform, including moving machinery or robotic equipment.

In the depicted implementation, the radar system 104 is mounted on the front of the vehicle 102 and illuminates the object 110. The radar system 104 can detect the object 110 from any exterior surface of the vehicle 102. For example, vehicle manufacturers can integrate the radar system 104 into a bumper, side mirror, headlights, rear lights, or any other interior or exterior location where the object 110 requires detection. In some cases, the vehicle 102 includes multiple radar systems 104, such as a first radar system 104 and a second radar system 104, that provide a larger instrument field-of-view 108. In general, vehicle manufacturers can design the locations of the radar systems 104 to provide a particular field-of-view 108 that encompasses a region of interest. Example fields-of-view 108 include a 360-degree field-of-view, one or more 180-degree fields-of-view, one or more 90-degree fields-of-view, and so forth, which can overlap or be combined into a field-of-view 108 of a particular size.

The object 110 is composed of one or more materials that reflect radar or EM signals. Depending on the application, the object 110 can represent a target of interest. In some cases, the object 110 can be a moving object (e.g., another vehicle) or a stationary object (e.g., a roadside sign, road barrier, debris). Depending on the application, the object 110 can represent a target of interest from which the vehicle 102 can safely navigate the roadway 106.

The radar system 104 emits EM radiation by transmitting EM signals or waveforms via antenna elements. For example, in the environment 100, the radar system 104 can detect and track the object 110 by transmitting and receiving one or more EM signals. For example, the radar system 104 can transmit EM signals between one hundred and four hundred gigahertz (GHz), between four and one hundred GHz, or between approximately seventy and eighty GHz.

The radar system 104 can be a MIMO radar system that can match the reflected EM signals to corresponding objects 110. The radar system 104 can also operate as a traditional radar system that does not rely on MIMO techniques. The radar system 104 can include a transmitter 112 to transmit EM signals. The radar system 104 can also include a receiver 114 to receive reflected versions of the EM signals. The transmitter 112 includes one or more components, including an antenna or antenna elements, for emitting the EM signals. The receiver 114 includes one or more components, including an antenna or antenna elements, for detecting the reflected EM signals. The transmitter 112 and the receiver 114 can be incorporated together on the same integrated circuit (e.g., a transceiver integrated circuit) or separately on different integrated circuits. In other implementations, the radar system 104 does not include a separate antenna, but the transmitter 112 and the receiver 114 each include one or more antenna elements.

The radar system 104 can also include the polyphase shifters 116. The polyphase shifters 116 are respectively associated with and operably connected to the transmitter 112, the receiver 114, or both. The polyphase shifters 116 can apply a phase shift to one or more signal pulses of the EM signal transmitted by the transmitter 112 in some applications. In other implementations, the polyphase shifters 116 can apply a phase shift to one or more signal pulses of the reflected EM signal received by the receiver 114. In yet other implementations, the polyphase shifters 116 can apply a phase shift to both the transmitted EM signals and the received EM signals.

The radar system 104 also includes one or more processors 118 (e.g., an energy processing unit) and computer-readable storage media (CRM) 120. The processor 118 can be a microprocessor or a system-on-chip. The processor 118 can execute instructions stored in the CRM 120. For example, the processor 118 can process EM energy received by the receiver 114 and determine, using a spectrum analysis module 122 and non-coherent integrator 124, the location of the object 110 relative to the radar system 104. The processor 118 can also detect various features (e.g., range, target angle, range rate, velocity) of the object 110. The processor 118 can include instructions or be configured to control the transmitter 112, the receiver 114, and the polyphase shifters 116. The processor 118 can also generate radar data for at least one automotive system. For example, the processor 118 can control, based on processed EM energy from the receiver 114, an autonomous or semi-autonomous driving system of the vehicle 102.

The spectrum analysis module 122 allows for multiple channels in the received EM signals to resolve Doppler ambiguities among the received EM signals. In particular, the spectrum analysis module 122 can divide a Doppler-frequency spectrum of the received EM signals into several sectors. The sectors represent a respective frequency range within the Doppler-frequency spectrum. For example, the spectrum analysis module 122 can generate more sectors than the number of channels and equally size the sectors. As another example, the spectrum analysis module 122 can generate the same number of sectors as channels and unequally size the sectors (e.g., each sector has a different frequency width). As yet another example, the spectrum analysis module 122 can generate the same number of sectors as channels and size the sectors with a subset of equally sized sectors and another subset of unequally sized sectors. The Detailed Description describes the generation of the sectors and association of channels to sectors in greater detail with respect to FIGS. 9 through 11. The radar system 104 can implement the spectrum analysis module 122 as instructions in the CRM 120, hardware, software, or a combination thereof executed by the processor 118.

The non-coherent integrator 124 can process EM energy received by the receiver 114 to identify the objects 110 and resolve Doppler ambiguities regarding the objects 110 within the field-of-view 108 of the radar system 104. The non-coherent integrator 124 can use several schemes to reject aliased detections and resolve Doppler ambiguities. The schemes used by the non-coherent integrator 124 can include single-channel detection and dealiasing, circular shifting and minimum analysis, summation and carrier knowledge, sector-based integration and maximum analysis, and circular shifting and minimum and maximum analysis, as described in greater detail with respect to FIGS. 12 through 17. The radar system 104 can implement the non-coherent integrator 124 as instructions in the CRM 120, hardware, software, or a combination thereof executed by the processor 118.

The described radar system 104 can facilitate the simultaneous transmission of multiple transmitter channels for a MIMO radar system with polyphase shifters 116. The described aspects of FDM with polyphase shifters support multiple transmitters 112 transmitting simultaneously with accurate recovery and without Doppler ambiguity. Accurate recovery is possible because interference among channels is avoided using the spectrum analysis module 122. Doppler ambiguity is resolved using the non-coherent integrator 124 to reject aliased detections.

As an example environment, FIG. 1 illustrates the vehicle 102 traveling on the roadway 106. The radar system 104 detects the object 110 in front of the vehicle 102. The radar system 104 can define a coordinate system with an x-axis (e.g., in a forward direction along the roadway 106), and a y-axis (e.g., perpendicular to the x-axis and along a surface of the roadway 106), in some cases, further defining a z-axis (e.g., normal to the x-y plane defined by the x and y axis). The transmitter 112 of the radar system 104 can transmit EM signals in front of the vehicle 102. The object 110 can reflect the transmitted EM signals as reflected EM signals. The receiver 114 can detect the reflected EM signals.

The vehicle 102 can also include at least one automotive system that relies on data from the radar system 104, such as a driver-assistance system, an autonomous-driving system, or a semi-autonomous-driving system. The radar system 104 can include an interface to an automotive system that relies on the data. For example, via the interface, the processor 118 outputs a signal based on EM energy received by the receiver 114.

Generally, the automotive systems use radar data provided by the radar system 104 to perform a function. For example, the driver-assistance system can provide blind-spot monitoring and generate an alert that indicates a potential collision with the object 110 that is detected by the radar system 104. The radar data from the radar system 104 indicates when it is safe or unsafe to change lanes in such an implementation. The autonomous-driving system may move the vehicle 102 to a particular location on the roadway 106 while avoiding collisions with the object 110 detected by the radar system 104. The radar data provided by the radar system 104 can provide information about the distance to and the location of the object 110 to enable the autonomous-driving system to perform emergency braking, perform a lane change, or adjust the speed of the vehicle 102.

Figure 2:
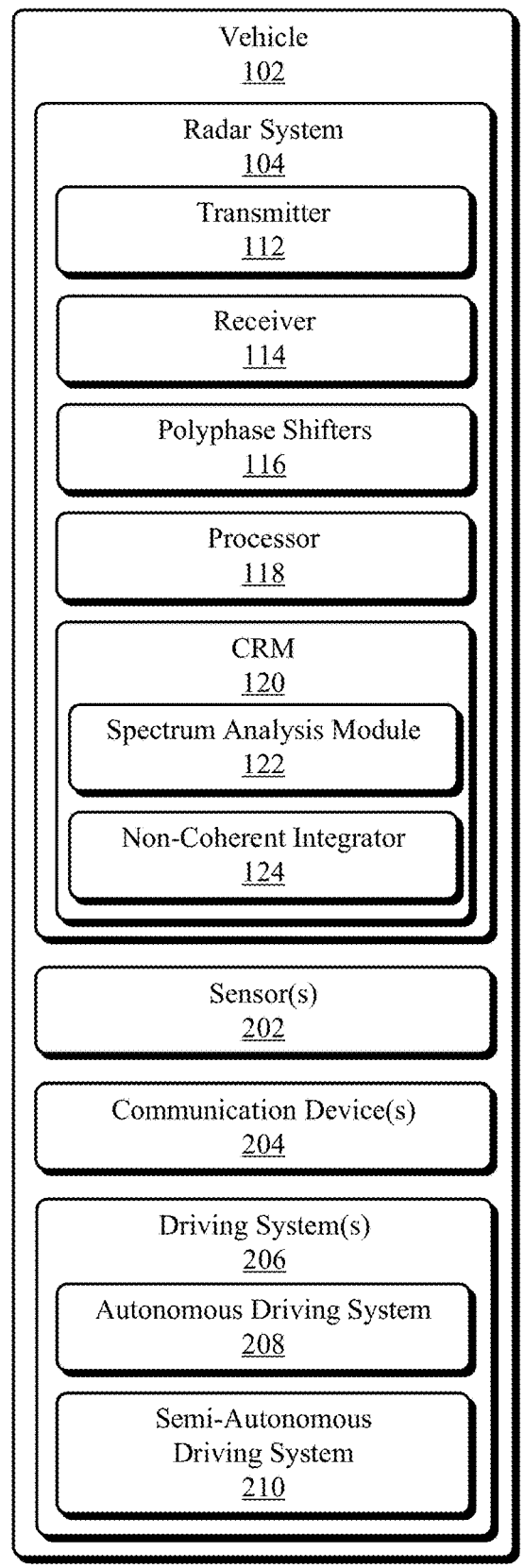
FIG. 2 illustrates an example configuration of a radar system using FDM with polyphase shifters within a vehicle in accordance with techniques of this disclosure.

FIG. 2 illustrates an example configuration of a radar system using FDM with polyphase shifters within the vehicle 102 in accordance with the techniques of this disclosure. The vehicle 102 can include driving systems 206, including an autonomous driving system 208 or semi-autonomous driving system 210, that use radar data from the radar system 104 to control the vehicle 102. As described with respect to FIG. 1, the vehicle 102 can include the radar system 104.

The vehicle can also include one or more sensors 202, one or more communication devices 204, and the driving systems 206. The sensors 202 can include a location sensor, a camera, a lidar system, or a combination thereof. The location sensor, for example, can include a positioning system that can determine the position of the vehicle 102. The camera system can be mounted on or near the front of the vehicle 102. The camera system can take photographic images or video of the roadway 106. In other implementations, a portion of the camera system can be mounted into a rear-view mirror of the vehicle 102 to have a field-of-view of the roadway 106. In yet other implementations, the camera system can project the field-of-view from any exterior surface of the vehicle 102. For example, vehicle manufacturers can integrate at least a part of the camera system into a side mirror, bumper, roof, or any other interior or exterior location where the field-of-view includes the roadway 106. The lidar system can use electromagnetic signals to detect the objects 110 (e.g., other vehicles) on the roadway 106. Data from the lidar system can provide an input to the spectrum analysis module 122 or the non-coherent integrator 124. For example, the lidar system can determine the traveling speed of a vehicle in front of the vehicle 102 or nearby vehicles traveling in the same direction as the vehicle 102.

The communication devices 204 can be radio frequency (RF) transceivers to transmit and receive RF signals. The transceivers can include one or more transmitters and receivers incorporated together on the same integrated circuit (e.g., a transceiver integrated circuit) or separately on different integrated circuits. The communication devices 204 can be used to communicate with remote computing devices (e.g., a server or computing system providing navigation information or regional speed limit information), nearby structures (e.g., construction zone traffic signs, traffic lights, school zone traffic signs), or nearby vehicles. For example, the vehicle 102 can use the communication devices 204 to wirelessly exchange information with nearby vehicles using vehicle-to-vehicle (V2V) communication. The vehicle 102 can use V2V communication to obtain the speed, location, and heading of nearby vehicles. Similarly, the vehicle 102 can use the communication devices 204 to wirelessly receive information from nearby traffic signs or structures to indicate a temporary speed limit, traffic congestion, or other traffic-related information.

The communication devices 204 can include a sensor interface and a driving system interface. The sensor interface and the driving system interface can transmit data over a communication bus of the vehicle 102, for example, between the radar system 104 and the driving systems 206.

The vehicle 102 also includes at least one driving system 206, such as the autonomous driving system 208 or the semi-autonomous driving system 210, that relies on data from the radar system 104 to control the operation of the vehicle 102 (e.g., set the driving speed or avoid the object 110). Generally, the driving systems 206 use data provided by the radar system 104, specifically the non-coherent integrator 124, and/or the sensors 202 to control the vehicle 102 and perform certain functions. For example, the semi-autonomous driving system 210 can provide adaptive cruise control and dynamically adjust the travel speed of the vehicle 102 based on the presence of the object 110 in front of the vehicle 102. In this example, the data from the non-coherent integrator 124 can identify the object 110 and its speed in relation to the vehicle 102.

The autonomous driving system 208 can navigate the vehicle 102 to a particular destination while avoiding the object 110 as identified by the non-coherent integrator 124 and/or the radar system 104. The data provided by the radar system 104 about the object 110 can provide information about the location and/or speed of the object 110 to enable the autonomous driving system 208 to adjust the speed of the vehicle 102.

Example Configurations

Figure 3:
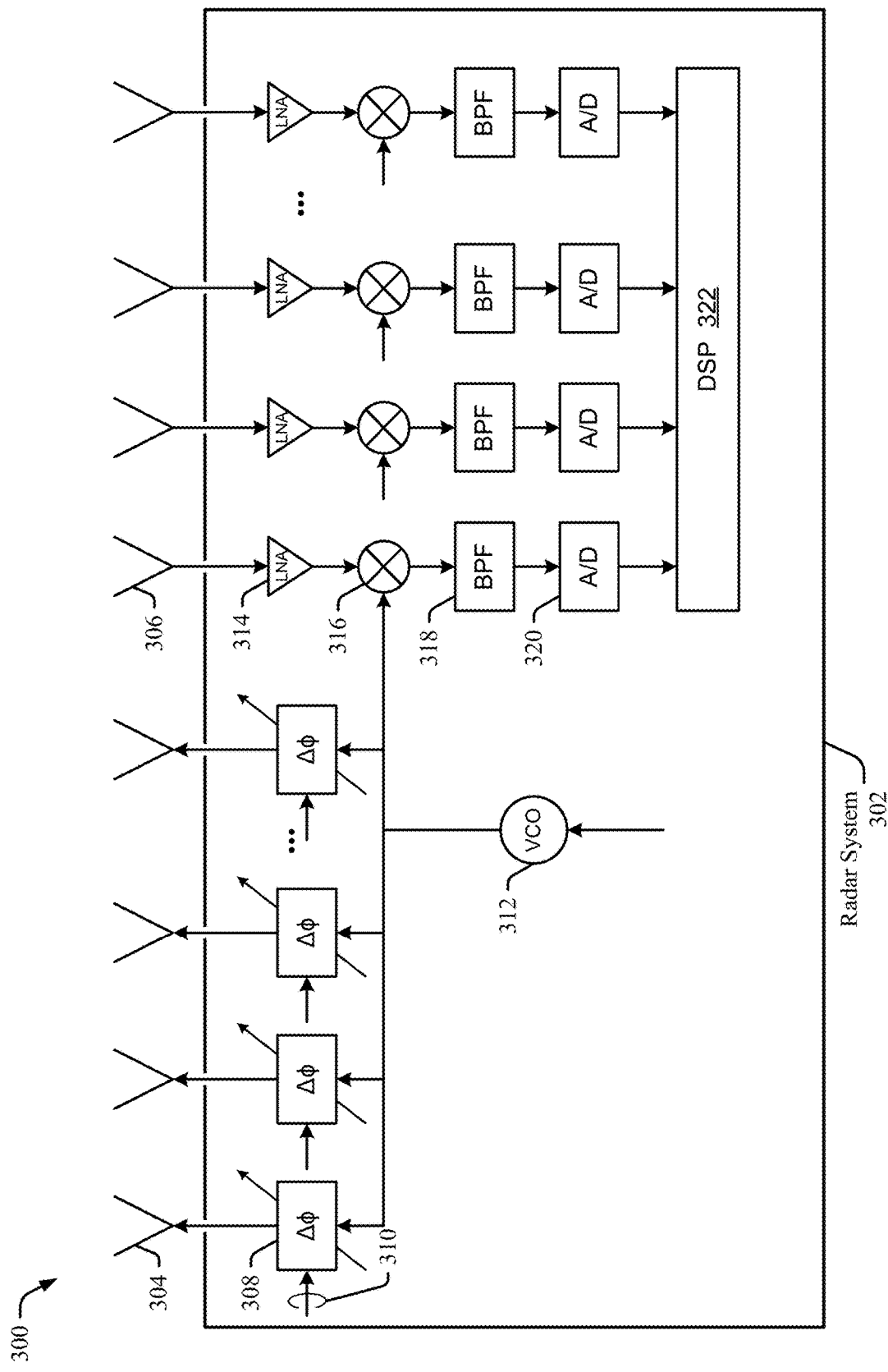

FIG. 3 illustrates an example conceptual diagram 300 of a radar system 302 that uses FDM with polyphase shifters 308. For example, the radar system 302 can be the radar system 104 of FIGS. 1 and 2. The conceptual diagram 300 illustrates components of the radar system 302 as distinct components, but some or all of them may be combined into a smaller subset of distinct components.

In the depicted implementation, the radar system 302 includes multiple transmitters 304, which are illustrated as antenna elements in this example, configured to transmit respective EM signals. The radar system 302 uses the transmitted EM signals to detect any objects 110 in the vicinity of the vehicle 102 within the field-of-view 108. The transmitters 304 can transmit a linear frequency-modulated signal (e.g., chirping signal) in some implementations. In other implementations, the transmitters 304 can transmit a phase-modulated continuous wave (PMCW) signal or a pulse signal (e.g., unmodulated signal). The transmitted EM signals can be any viable signal use for a radar system. The radar system 302 also includes multiple receivers 306, which are illustrated as antenna elements in this example, configured to receive reflected EM signals reflecting by the objects 110.

The radar system 302 includes a processor and CRM, which can be the processor 118 and the CRM 120 of FIGS. 1 and 2, respectively. The CRM includes instructions that, when executed by the processor, causes the processor to control the transmitters 304 or the phase shifters 308. For example, the processor can use the spectrum analysis module 122 to control the phase shift applied or introduced to the transmitted EM signals.

In the illustrated example, the radar system 302 includes a voltage-controlled oscillator (VCO) 312 operatively coupled to the transmitters 304. The VCO 312 provides the basis or reference signal for EM signals transmitted by the transmitters 304. The multiple polyphase shifters 308 are respectively associated with the transmitters 304 and coupled to the transmitters 304 and the VCO 312. In the depicted implementation, a phase shifter 308 is operatively coupled to each transmitter 304. In other implementations, a phase shifter 308 can be operatively coupled to fewer than each transmitter 304.

The polyphase shifters 308 can control a phase shift applied or introduced to one or more EM signal pulses transmitted by the transmitters 304. Each polyphase shifter 308 has multiple potential output stages (e.g., 4, 8, 16, 32, or 64 stages). For example, the processor can provide a polyphase control signal 310 to the polyphase shifters 308 to control or set the phase stage of each polyphase shifter 308. The polyphase control signal 310 can be a multiple-bit signal (e.g., 2-bit, 3-bit, 4-bit, 5-bit, or 6-bit), allowing the polyphase shifters 308 to have more than two phase stages. The increased number of potential phase stages provides more flexibility in an FDM coding scheme applied by the radar system 302 than binary phase shifters can provide. The polyphase control signal 310 can add a progressive phase modulation φ to the transmitted EM signal pulses, which shifts the frequency or Doppler frequency of the reflected EM signals by an offset frequency $\omega_c$, which is equal to the product of two, pi, and the phase modulation (e.g., $\omega_c = 2\pi\phi$).

As described above, the receivers 306 receive reflected EM signals. The radar system 302 processes the received EM signals to make one or more determinations regarding objects 110 within the field-of-view 108 of the radar system 302. The receivers 306 are operatively coupled to respective low noise amplifiers (LNAs) 314. The LNAs 314 can amplify the received EM signal without significant degradation to the signal-to-noise ratio. The LNAs 314 are operatively coupled to respective mixers 316, which are coupled to the VCO 312. The output of the VCO 312 serves as a reference signal and combines with the respective received EM signals in the mixers 316. The radar system 302 passes the respective received EM signals through band-pass filters (BPFs) 318 and analog-to-digital converters (ADCs) 320 before analyzing them with a digital signal processor (DSP) 322. The DSP 322 can make one or more determinations regarding the objects 110, including resolving Doppler ambiguities. The BPFs 318 can pass frequencies in the received EM signals within a specific range and reject or attenuate frequencies outside this range. In other implementations, the radar system 302 can use additional or different filters, including low-pass filters or high-pass filters. The ADCs 320 converts the analog EM signals into a digital signal. The DSP 322 can use the non-coherent integrator 124 to resolve Doppler ambiguities and identify the Doppler frequency associated with the objects 110. Although the DSP 322 is illustrated as a separate component from the processor, the radar system 302 can include a single processor that controls the transmission of EM signals and makes determinations from the reception of EM signals.

Figures 1, 4:
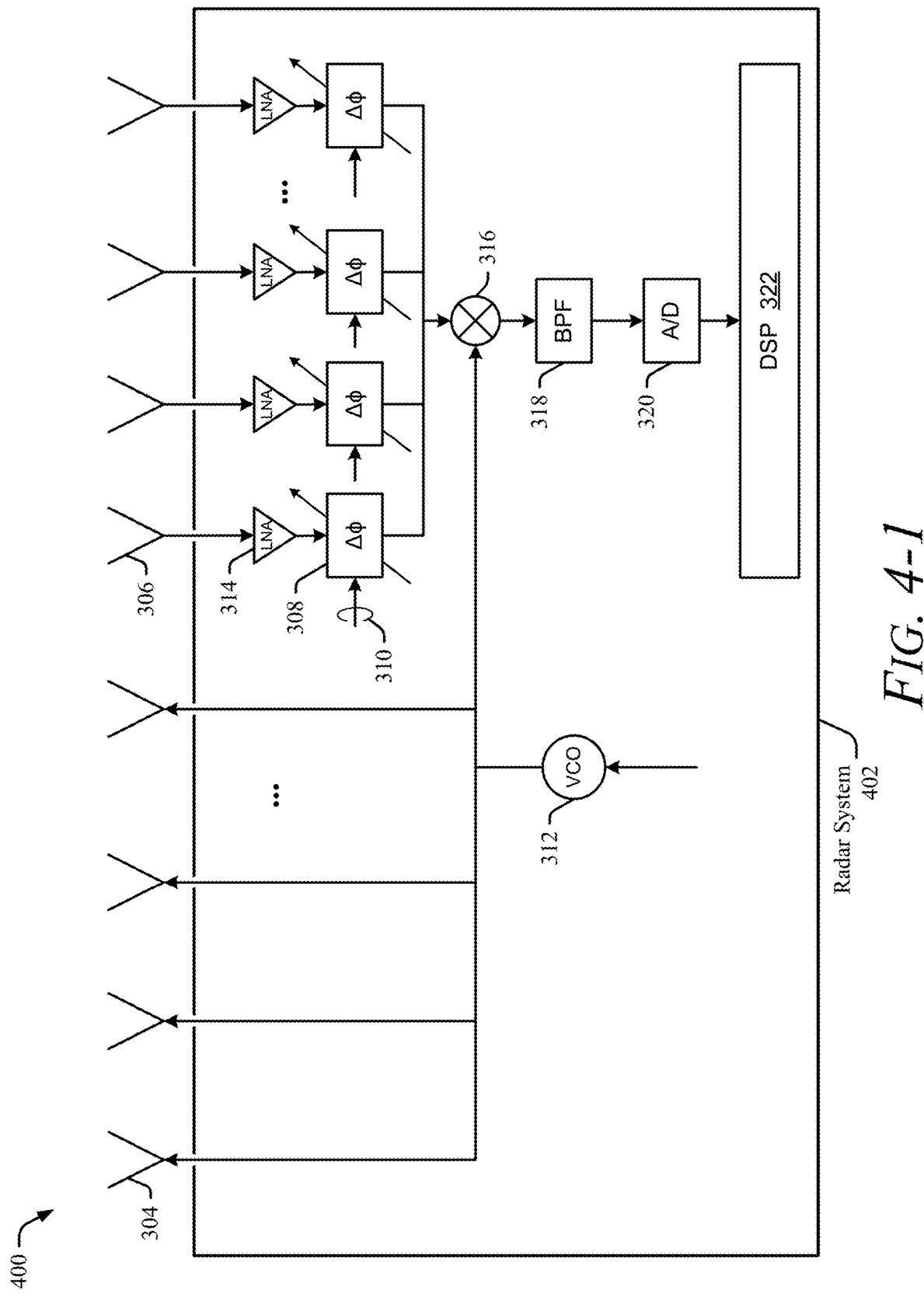
Figures 2, 4:
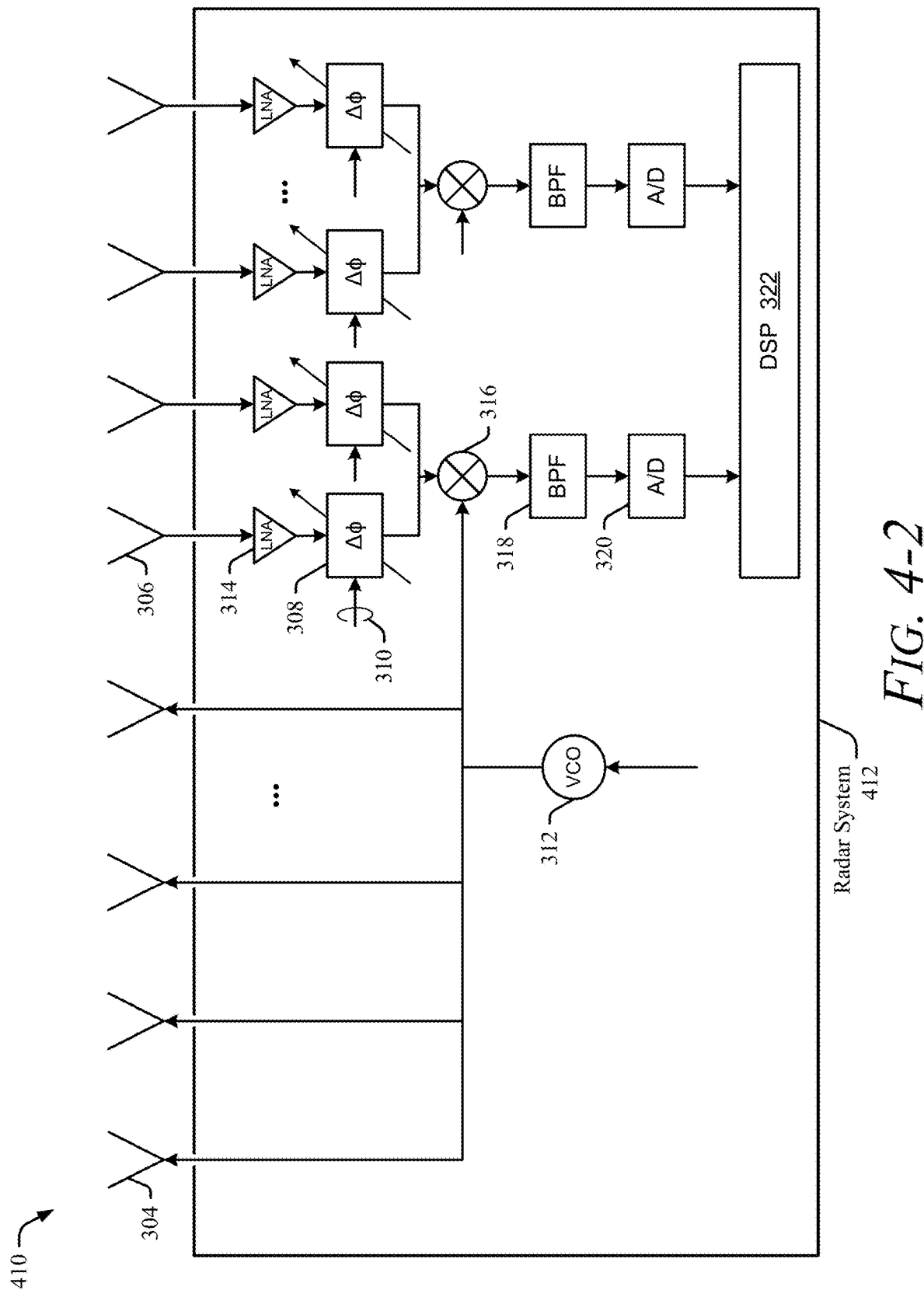

FIGS. 4-1 and 4-2 illustrate other example conceptual diagrams 400 and 410 of a radar system 402 and 412, respectively, that uses FDM with polyphase shifters 308. For example, the radar system 402 and 412 can be the radar system 104 of FIGS. 1 and 2. The conceptual diagrams 400 and 410 illustrate components of the radar system 402 and 412, respectively, as distinct components, but some or all of them may be combined into a smaller subset of distinct components.

The radar systems 402 and 412 include similar components as depicted for the radar system 302 in FIG. 3. For example, the radar systems 402 and 412 include the transmitters 304, receivers 306, a processor, CRM, polyphase shifters 308, VCO 312, LNAs 314, the mixer 316, the BPF 318, the ADC 320, and the DSP 322. The polyphase shifters 308 are operatively coupled to the LNAs 314 and the mixer 316 in the receiver paths of the radar systems 402 and 412. In FIG. 4-1, the polyphase shifters 308 are operatively coupled to each receive channel and then operatively coupled to a single down-conversion or analog-to-digital conversion channel. In FIG. 4-2, the polyphase shifters 308 are operatively coupled to each receive channel and a subset of the receive channels or polyphase shifters 308 are then operatively coupled to a down-conversion or analog-to-digital conversion channel. As illustrated in the conceptual diagram 410, the radar system 412 includes two polyphase shifters 308 or receive channels per down-conversion or analog-to-digital conversion channel. In other implementations, the radar system 412 can include another number of polyphase shifters 308 or receive channels per down-conversion or analog-to-digital conversion channel, resulting in N receive groups with M receive channels per receive group.

The polyphase shifters 308 can also be operatively coupled in between other components in the receiver paths, including between the receivers 306 and the LNAs 314. The polyphase shifters 308 are not operatively coupled to the transmitters 304 but instead respectively associated with the receivers 306. The polyphase shifters 308 can introduce or apply a phase shift to the received EM signals. The radar system 402 or 412 can combine (e.g., super impose) the signals received by one or more of the receivers 306 prior to analog-to-digital conversion by the ADC 320.

As described above, each polyphase shifter 308 has multiple potential output stages (e.g., 4, 8, 16, 32, or 64 stages). For example, the processor 118 can provide the polyphase control signal 310 to the polyphase shifters 308 to control or set the phase stage of each polyphase shifter 308. The polyphase control signal 310 can be a multiple-bit signal (e.g., 2-bit, 3-bit, 4-bit, 5-bit, or 6-bit), giving the polyphase shifters 308 more than two phase stages. The increased number of potential phase stages provides more flexibility in an FDM coding scheme applied by the radar system 402 or 502 to the received EM signals than binary phase shifters can provide. The polyphase control signal 310 can add a progressive phase modulation $\phi$ to the received EM signal pulses, which shifts the frequency or Doppler frequency of the reflected EM signals by an offset frequency $\omega_c$, which is equal to the product of two, pi, and the phase modulation (e.g., $\omega_c = 2\pi\phi$).

Figures 1, 5:
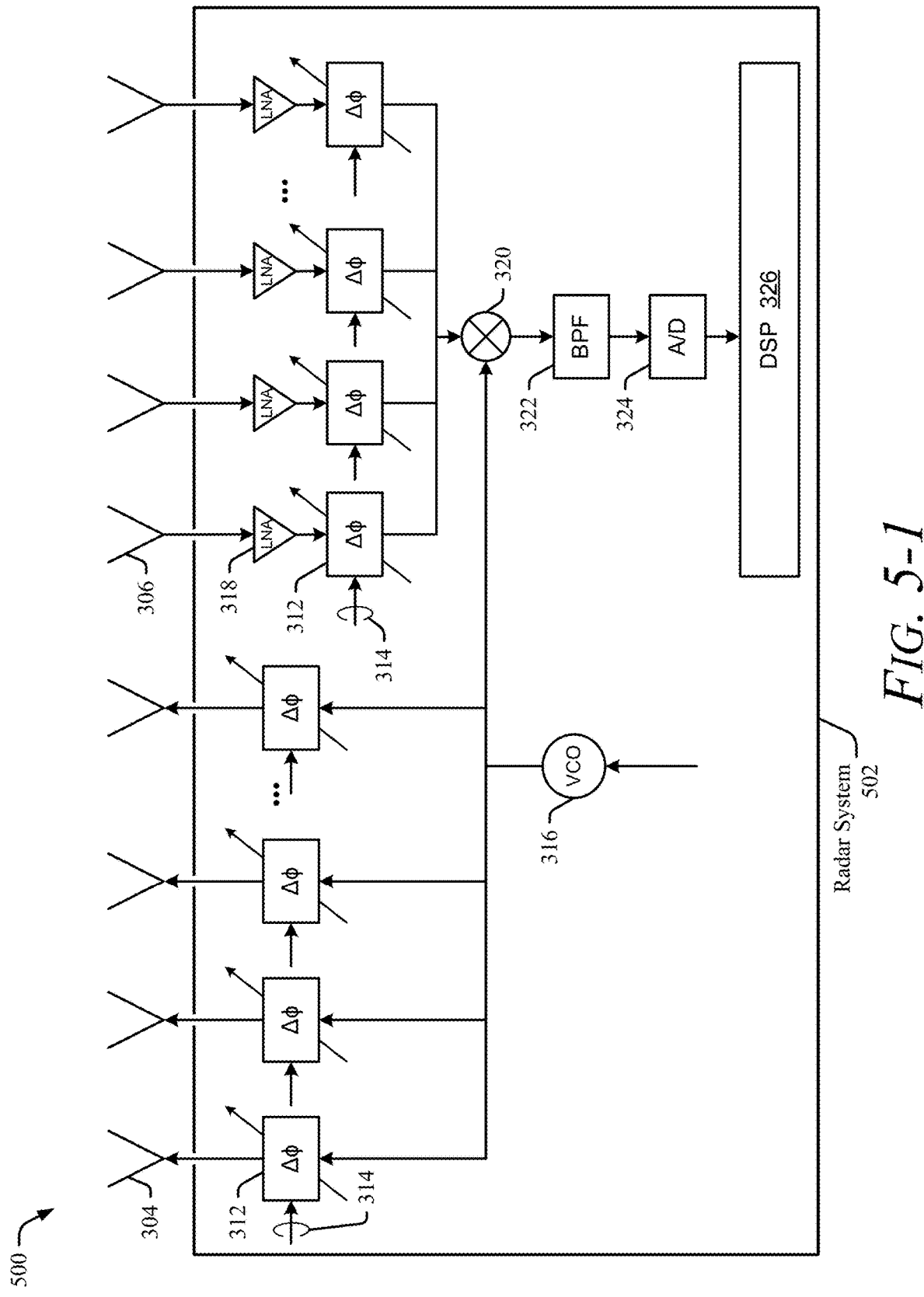
Figures 2, 5:
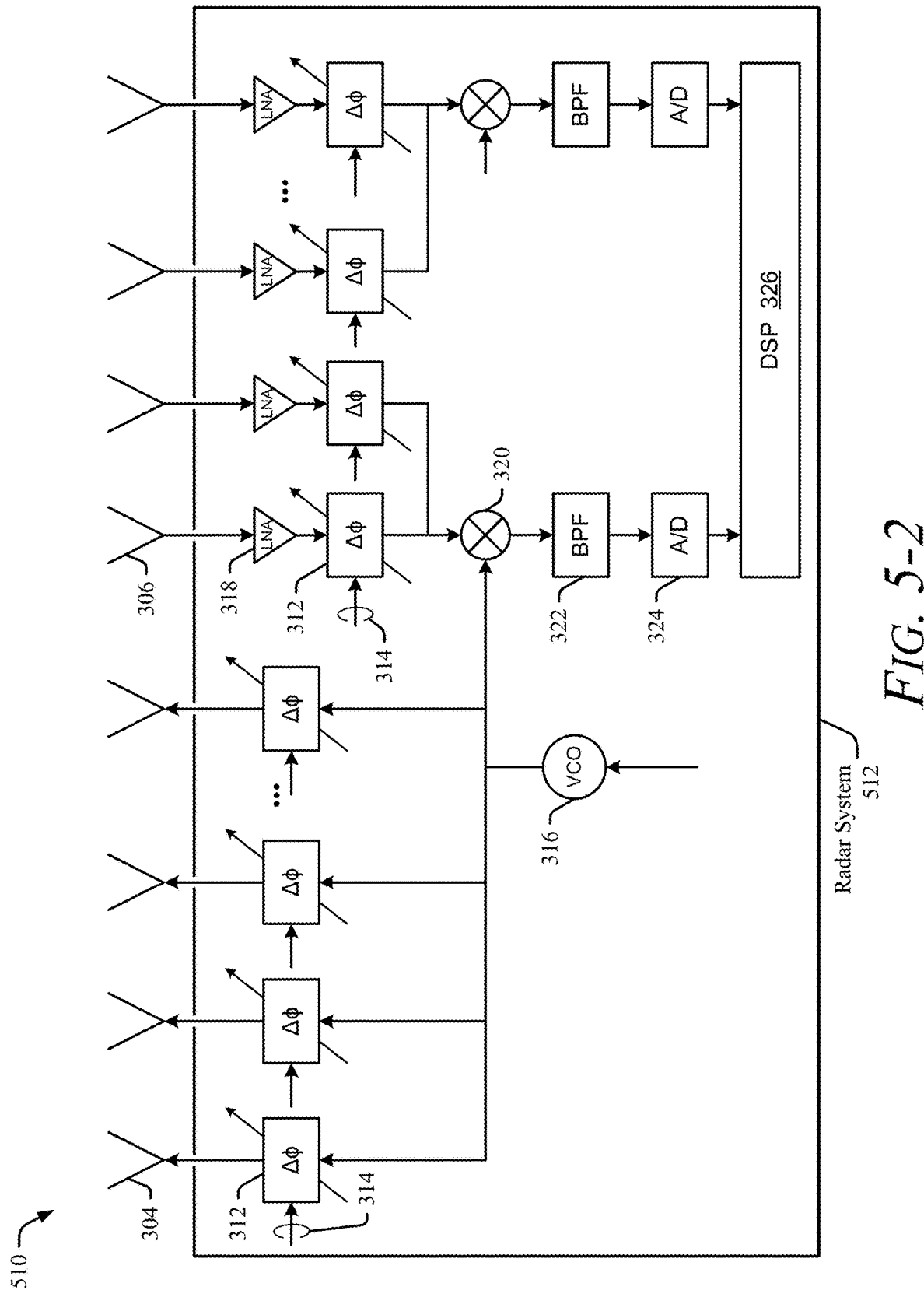

FIGS. 5-1 and 5-2 illustrate other example conceptual diagrams 500 and 510 of a radar system 502 and 512, respectively, that uses FDM with polyphase shifters 308. For example, the radar system 502 and 512 can be the radar system 104 of FIGS. 1 and 2. The conceptual diagrams 500 and 510 illustrate components of the radar system 502 and 512, respectively, as distinct components, but some or all of them may be combined into a smaller subset of distinct components.

The radar systems 502 and 512 include similar components as depicted for the radar systems 302, 402, and 412 of FIGS. 3, 4-1, and 4-2, respectively. For example, the radar systems 502 and 512 include the transmitters 304, receivers 306, a processor, CRM, polyphase shifters 308, VCO 312, LNAs 314, mixers 316, BPFs 318, ADCs 320, and DSP 322. The polyphase shifters 308 are operatively coupled to the transmitters 304 and VCO 312 in the transmit paths and the LNAs 314 and mixers 316 in the receive path.

In FIG. 5-1, the polyphase shifters 308 are operatively coupled to each receive channel and then operatively coupled to a single down-conversion or analog-to-digital conversion channel in the receive path. In FIG. 5-2, the polyphase shifters 308 are operatively coupled to each receive channel and a subset of the receive channels or polyphase shifters 308 are then operatively coupled to a down-conversion or analog-to-digital conversion channel in the receive path. As illustrated in the conceptual diagram 510, the radar system 512 includes two polyphase shifters 308 or receive channels per down-conversion or analog-to-digital conversion channel in the receive path. In other implementations, the radar system 512 can include another number of polyphase shifters 308 or receive channels per down-conversion or analog-to-digital conversion channel in the receive path, resulting in N receive groups with M receive channels per receive group in the receive path.

The polyphase shifters 308 can be operatively coupled to different components in the transmit paths and the receive paths in other implementations. In the radar systems 502 and 512, the polyphase shifters 308 are respectively associated with both the transmitters 304 and the receivers 306. The polyphase shifters 308 can apply or introduce a phase shift to the transmitted EM signals and/or the received EM signals in the depicted implementation.

As described above, each polyphase shifter 308 has multiple potential output stages (e.g., 4, 8, 16, 32, or 64 stages). For example, the processor 118 can provide the polyphase control signal 310 to the polyphase shifters 308 to control or set the phase stage of each polyphase shifter 308. The polyphase control signal 310 can be a multiple-bit signal (e.g., 2-bit, 3-bit, 4-bit, 5-bit, or 6-bit), allowing the polyphase shifters 308 to have more than two phase stages. The increased number of potential phase stages provides more flexibility in a coding scheme applied by the radar system 502 or 512 to the transmitted EM signals and/or received EM signals than binary phase shifters can provide. The polyphase control signal 310 can add a progressive phase modulation φ to the transmitted EM signal pulses and/or the received EM signal pulses, which shifts the frequency or Doppler frequency of the reflected EM signals by an offset frequency $\omega_c$, which is equal to the produce of two, pi, and the phase modulation (e.g., $\omega_c=2\pi\phi$).

Figure 6:
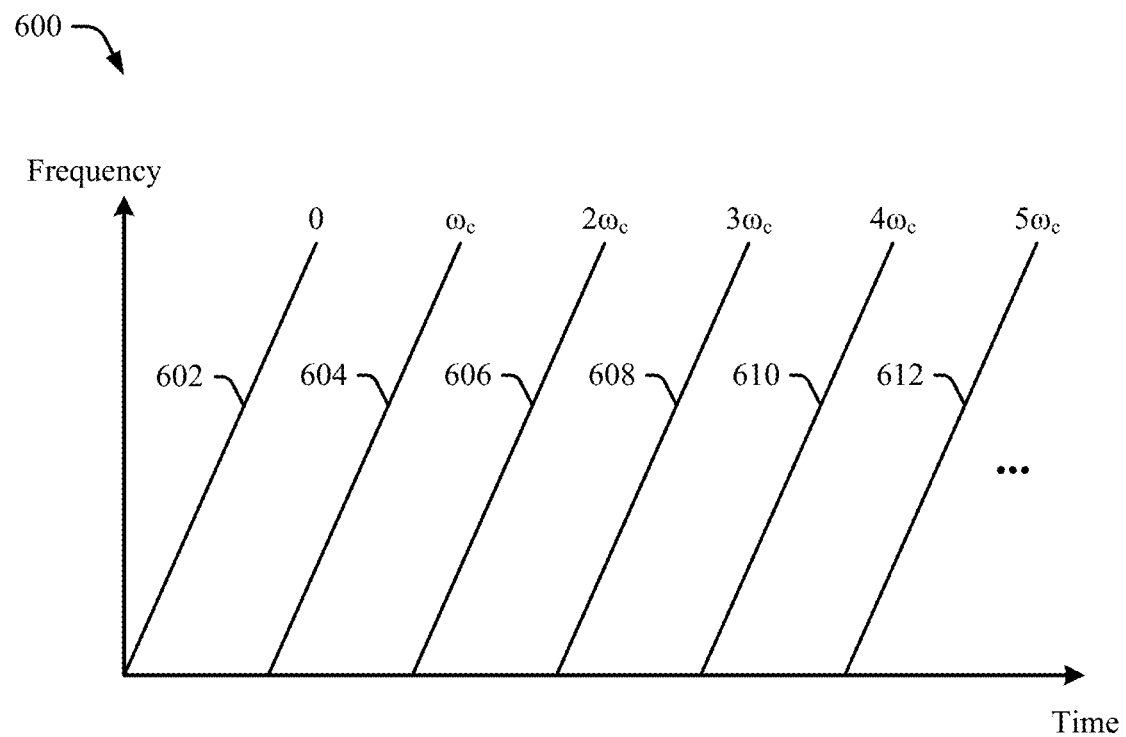
FIG. 6 illustrates an example diagram of transmitted EM signals using FDM with polyphase shifters.

FIG. 6 illustrates an example diagram 600 of transmitted EM signals using FDM with polyphase shifters. For example, the diagram 600 illustrates the EM signals transmitted by the transmitters 304 of FIG. 3 or 5. In other implementations, the diagram 600 can illustrate the EM signals received by the receivers 306 of FIG. 4 or 5. As described above, the transmitters 304 can transmit a linear frequency-modulated signal (e.g., chirping signal), phase-modulated continuous wave (PMCW) signal, or pulse signal (e.g., unmodulated signal) in other implementations.

The diagram 600 illustrates an example strategy for controlling the transmitters 304 and/or the receivers 306. For example, a first one of the transmitters 304 transmits a first signal pulse 602 based on operation of the VCO 312. The first signal pulse 602 has a first phase, which corresponds to zero degrees in this example. The first phase may be considered a base or reference phase.

A second one of the transmitters 304 transmits a second signal pulse 604 based on operation of the VCO 312 and the respective polyphase shifter 308. The second signal pulse 604 has a second phase, which is phase-shifted from the first signal pulse 602 by a shift phase of φ. As a result, the second phase is offset by a channel frequency $\omega_c$, which is equal to $2\pi\phi$, from the first phase.

A third one of the transmitters 304 transmits a third signal pulse 606 based on operation of the VCO 312 and the respective polyphase shifter 308. The third signal pulse 606 has a third phase, which is phase-shifted from the first signal pulse 602 by a shift phase of 2φ. As a result, the third phase is offset by a channel frequency $2\omega_c$, from the first phase.

A fourth one of the transmitters 304 transmits a fourth signal pulse 608 based on operation of the VCO 312 and the respective polyphase shifter 308. The fourth signal pulse 608 has a fourth phase, which is phase-shifted from the first signal pulse 602 by a shift phase of 3φ. As a result, the fourth phase is offset by a channel frequency $3\omega_c$, from the first phase.

A fifth one of the transmitters 304 transmits a fifth signal pulse 610 based on operation of the VCO 312 and the respective polyphase shifter 308. The fifth signal pulse 610 has a fifth phase, which is phase-shifted from the first signal pulse 602 by a shift phase of 4φ. As a result, the fifth phase is offset by a channel frequency $4\omega_c$, from the first phase.

A sixth one of the transmitters 304 transmits a sixth signal pulse 612 based on operation of the VCO 312 and the respective polyphase shifter 308. The sixth signal pulse 612 has a sixth phase, which is phase-shifted from the first signal pulse 602 by a shift phase of 5φ. As a result, the sixth phase is offset by a channel frequency $5\omega_c$, from the first phase.

Having signal pulses transmitted simultaneously and including a phase shift makes it possible to accurately recover the received EM signal information without Doppler ambiguity. The MIMO features can also reduce or eliminate signal-to-noise loss. In other implementations, the radar system can use a mixture of FDM and CM (e.g., code division multiplexing) schemes to apply the described phase shifts to the transmitted EM signals. The radar system can also use a pseudorandom outer code to apply the described phase shifts.

Figure 7:
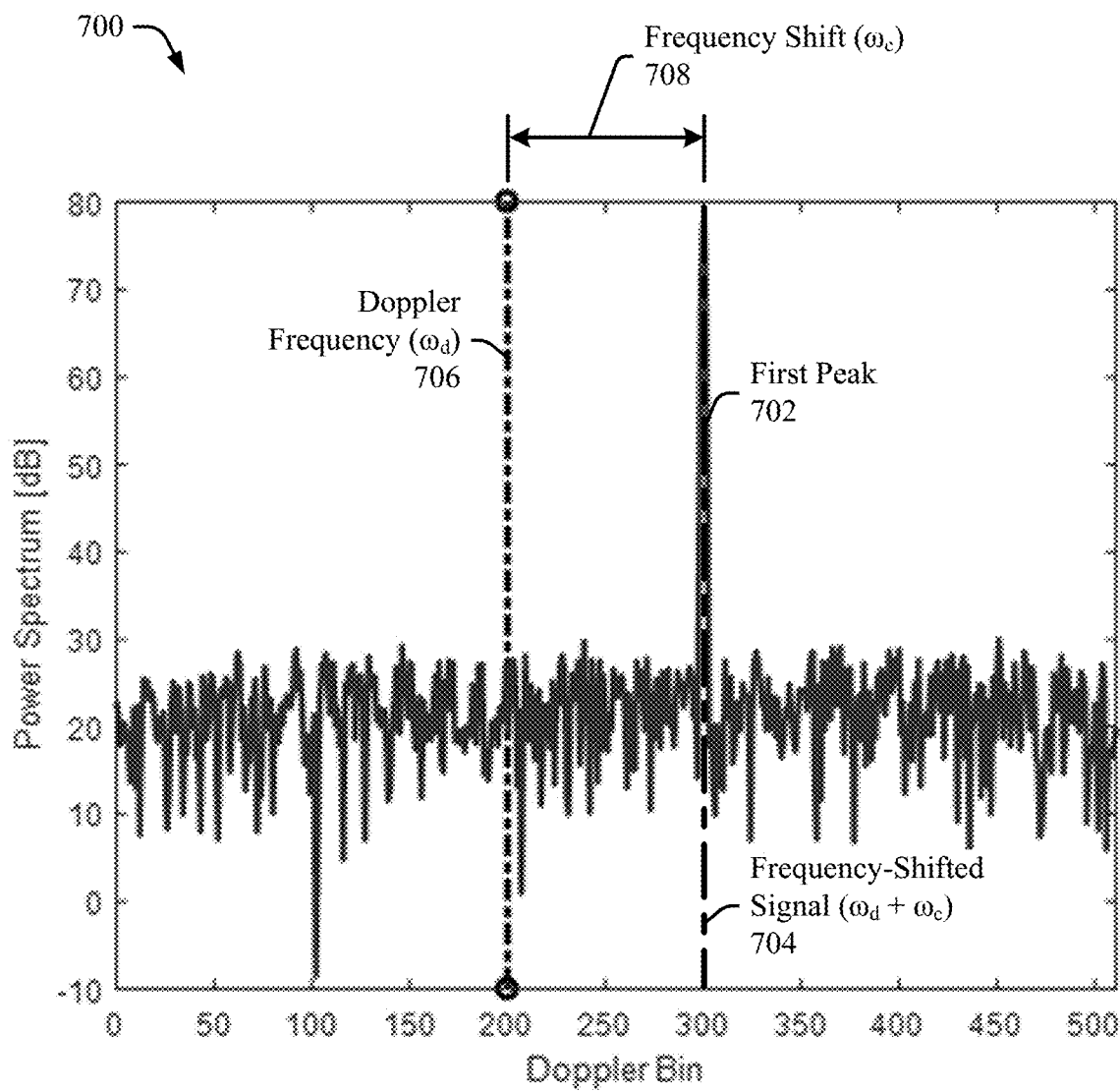
FIG. 7 illustrates an example graph of a received EM signal of a radar system using FDM with polyphase shifters in a Doppler bin representation.

FIG. 7 illustrates an example graph 700 of a received EM signal of a radar system using FDM with polyphase shifters in a Doppler bin representation. The radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2.

The received EM signal corresponds to one of the signal pulses and includes a first peak 702. The first peak 702 has a first magnitude and is centered at the frequency-shifted signal 704, which is dependent on the Doppler frequency $\omega_D$ 706 and the frequency shift $\omega_c$ 708. As described with respect to FIG. 6, the frequency shift 708 is proportional to the phase shift introduced by the polyphase shifters 308. The Doppler frequency 706 is related to the relative difference in velocity between the object 110 and the radar system 104. In the described radar system 104, the received EM signals can include several peaks associated with a single object 110. The techniques and systems described with respect to FIGS. 8 through 17 enable the radar system 104 to identify the actual peaks associated with the object 110 and resolve Doppler ambiguities in the received EM signals.

Example Methods

Figure 8:
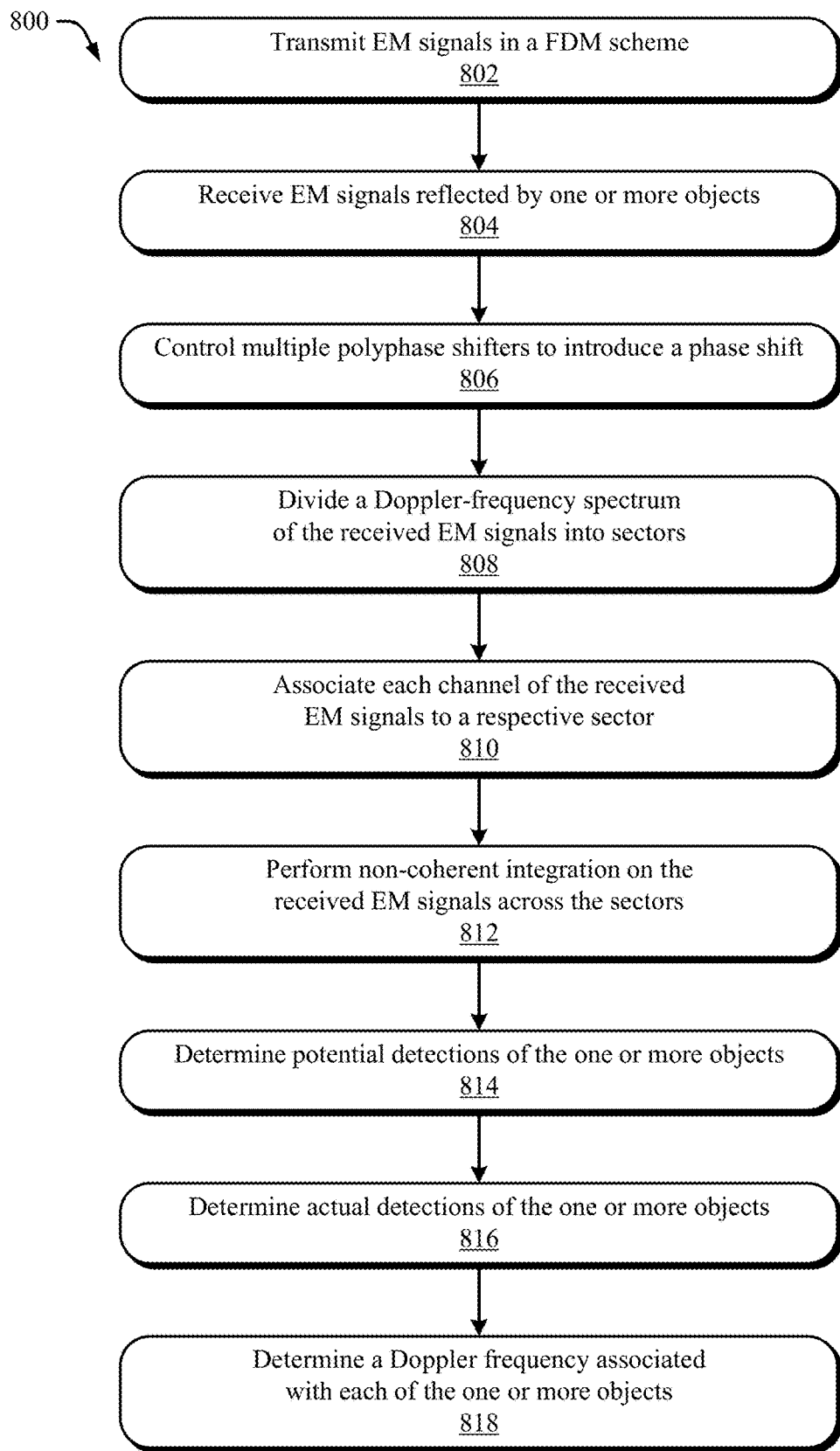
FIG. 8 illustrates an example method for a radar system that uses FDM with polyphase shifters to determine a Doppler frequency of objects.

FIG. 8 illustrates an example method 800 for a radar system that uses FDM with polyphase shifters to determine a Doppler frequency of objects. Method 800 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 7, reference to which is made for example only. The techniques are not limited to performance by one entity or multiple entities. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines a Doppler frequency of objects 110 surrounding the vehicle 102.

At 802, the EM signals are transmitted by multiple transmitters of a radar system in an FDM scheme. The radar system including a first number of transmitters. For example, the transmitters 304 can transmit EM signals in an FDM scheme.

At 804, EM signals reflected by one or more objects are received by multiple receivers of the radar system. The radar system including a second number of receivers. The received EM signals include a number of channels equal to the product of the number of transmitters (e.g., the first number) and the number of receivers (e.g., the second number). For example, the receivers 306 can receive EM signals reflected by the objects 110. The objects 110 can reflect the EM signals transmitted by the transmitters 304. The received EM signals include a third number of channels, equal to the product of the first number and the second number.

At 806, multiple polyphase shifters are controlled to introduce a phase shift to the transmitted EM signals and/or the received EM signals. The multiple polyphase shifters are operably connected to the multiple transmitters and/or the multiple receivers of the radar system. The phase shift includes one of at least three potential phase shifts. For example, the polyphase shifters 308 are operably connected to the transmitters 304 and/or the receivers 306. The processor 118 can control the polyphase shifters 308 to introduce a phase shift to the transmitted EM signals and/or the received EM signals, wherein the phase shift includes one of at least three potential phase shifts. As described above, the processor 118 can use the polyphase control signal 310 to control the phase shifters 308. The polyphase control signal 310 can be a multiple-bit signal (e.g., 2-bit, 3-bit, 4-bit, 5-bit, or 6-bit), allowing the polyphase shifters 308 to have more than two phase stages. The increased number of potential phase stages provides more flexibility in a coding scheme applied to the transmitted EM signals and/or received EM signals than binary phase shifters can provide.

At 808, a Doppler-frequency spectrum of the received EM signals is divided into a fourth number of sectors. The sectors represent a respective frequency range within the Doppler-frequency spectrum. The number of sectors can be equal to or greater than the number of channels (e.g., the third number). For example, the spectrum analysis module 122 can divide the Doppler-frequency spectrum of the received EM signals into sectors. The number and size of the sectors can be selected to avoid a symmetrical radiation pattern among the channels in the received EM signals, as described in greater detail with respect to FIGS. 9 through 11.

At 810, each channel of the received EM signals is associated to a respective sector of the sectors. For example, the spectrum analysis module 122 can associate the channels of the received EM signals to a respective sector of the sectors. The association of the channels to respective sectors is described in greater detail with respect to FIGS. 9 through 11.

At 812, non-coherent integration is performed on the received EM signals across the sectors using at least one channel of the received EM signals. For example, the non-coherent integrator 124 can perform non-coherent integration on the received EM signals across the sectors of the Doppler-frequency spectrum. The non-coherent integration of the received EM signals is described in greater detail with respect to FIGS. 12 through 17.

At 814, potential detections of the one or more objects are determined based on the non-coherent integration. The potential detections include one or more actual detections and one or more aliased detections of the one or more objects. For example, the non-coherent integrator 124, the DSP 322, or the processor 118 can determine, based on the non-coherent integration, potential detections of the objects 110. The identification of potential detections for the objects 110 is described in greater detail with respect to FIGS. 12 through 17.

At 816, actual detections of the one or more objects are determined based on the potential detections. For example, the non-coherent integrator 124, the DSP 322, or the processor 118 can determine, based on the potential detections, the actual detections of the objects 110. The identification of actual detections for the objects 110 is described in greater detail with respect to FIGS. 12 through 17.

At 818, a Doppler frequency associated with each of the one or more objects is determined based on the actual detections. For example, the DSP 322 or the processor 118 can determine, based on the actual detections, the Doppler frequency associated with the objects 110. The identification of potential detections for the objects 110 is described in greater detail with respect to FIGS. 12 through 17.

Figure 9:
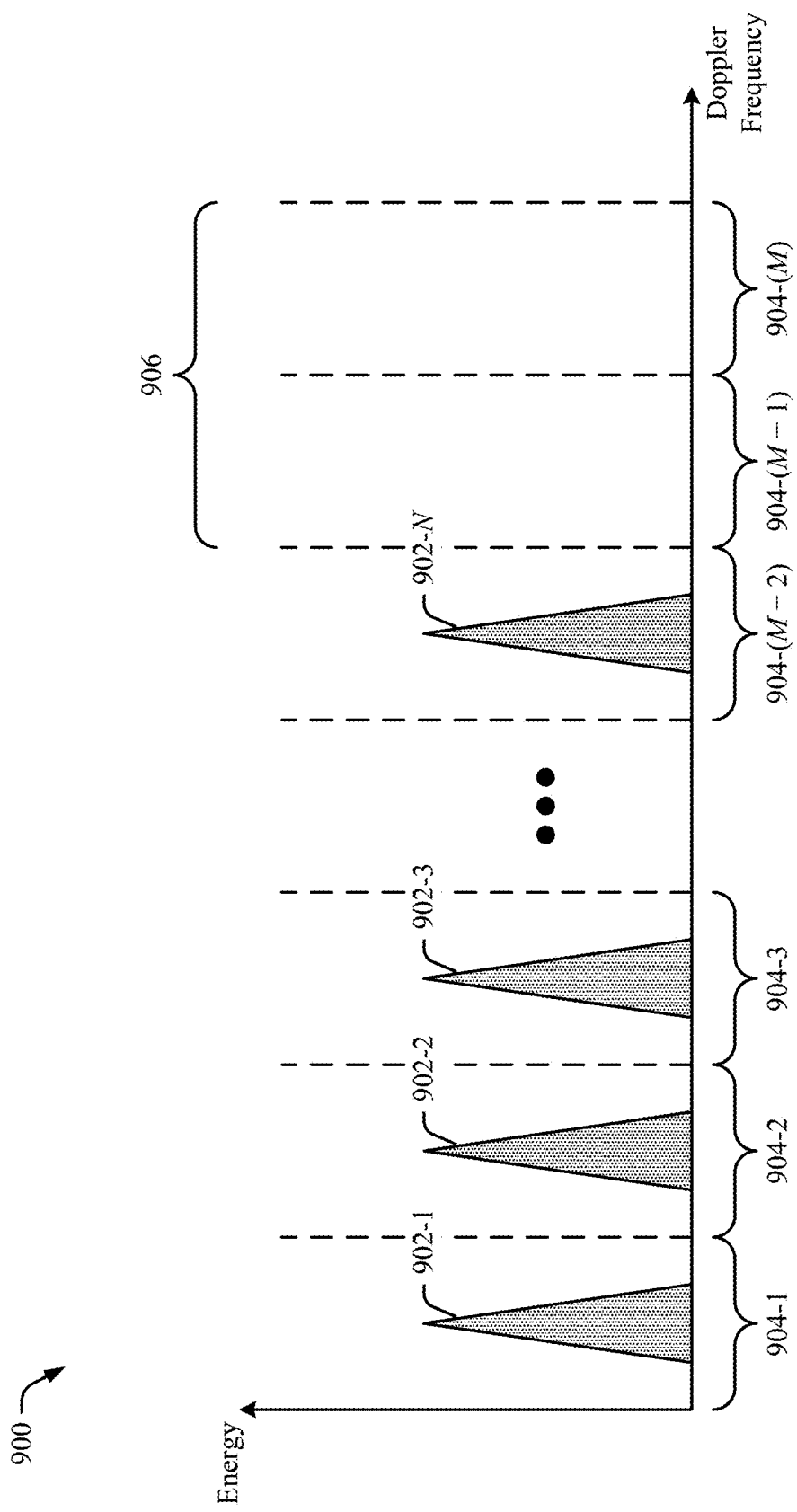
FIGS. 9-11 illustrate example graphical representations of the association of channels and sectors in a radar system using FDM with polyphase shifters.

FIG. 9 illustrates an example graphical representation 900 of the association of channels and sectors in a radar system using FDM with polyphase shifters. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2.

The graphical representation 900 illustrates energy of received EM signals as a y-axis and a corresponding Doppler frequency of the received EM signals as an x-axis. The received EM signals include N channels 902, which are represented in FIG. 9 by the triangular peaks corresponding to an actual detection or aliased detection within each channel.

The radar system 104 or the spectrum analysis module 122 divides the Doppler-frequency spectrum of the received EM signals into M sectors 904, which are equally sized. The sectors 904 represent a range of frequencies within the Doppler-frequency spectrum for the received EM signals. The radar system 104 or the spectrum analysis module 122 selects the number M of sectors 904 to be at least one greater than the number N of channels 902 (e.g., M≥N+1). Generally, the number M of sectors 904 is maintained sufficiently small to maintain separation among the channels 902 within the Doppler-frequency spectrum. Consider that the Doppler-frequency spectrum is divided into six sectors 904 (e.g., M equals six), and the spectrum analysis module 122 can assign each sector a frequency range of $\pi/3$ or sixty degrees.

The radar system 104 or the spectrum analysis module 122 associates or places the channels 902 in separate sectors, with one channel 902 per sector 904. Because the number N of channels 902 is less than the number M of sectors 904, there are one or more empty sectors 906 without a corresponding channel. The empty sectors 906 can be placed in various locations within the Doppler-frequency spectrum, including among, before, or after the channels 902. The placement of the channels 902 and the empty sectors 906 are arranged to avoid forming a symmetrical spectrum that can lead to ambiguity in resolving detections of the objects 110.

Placement of the channels 902 among the sectors 904 affects the non-coherent integration and de-aliasing logic used by the radar system 104 and/or the non-coherent integrator 124. For example, the radar system 104 or the non-coherent integrator 124 can perform non-coherent integration over a combination of N sectors 904 (e.g., $C_{N+M}^N$) to form (N+M) spectrums. The radar system 104 can then form a final non-coherent integrated spectrum by taking a maximum over the (N+M) spectrums at each frequency bin. The radar system 104 can then find the sector corresponding to each object from the combination that has the maximum value.

As another example, the radar system 104 or the spectrum analysis module 122 can divide the Doppler spectrum into $2^M$ equal sectors 904, where the number N of channels is less than $2^M$ but greater than or equal to $2^{M-1}$ (e.g., $2^{M-1} \leq N \leq 2^M$). The radar system 104 associates or places the channels 902 in separate sectors, with one channel 902 per sector 904 and ($2^M$–N) empty sectors 906. The empty sectors 906 can be placed in various locations within the Doppler spectrum, including among, before, or after the channels 902. If the number N of channels 902 is even, the channels 902 are asymmetrically placed among the sectors 904. The radar system 104 can perform non-coherent integration over consecutive N sectors 904 (e.g., $C_{N+M}^N$) to form $2^M$ spectrums. As described in greater detail with respect to FIGS. 15 and 16, the radar system 104 can then form a final non-coherent integrated spectrum by taking a maximum over the $2^M$ spectrums at each frequency bin. The radar system 104 can then find the sector corresponding to each object from the combination that has the maximum value.

Figure 10:
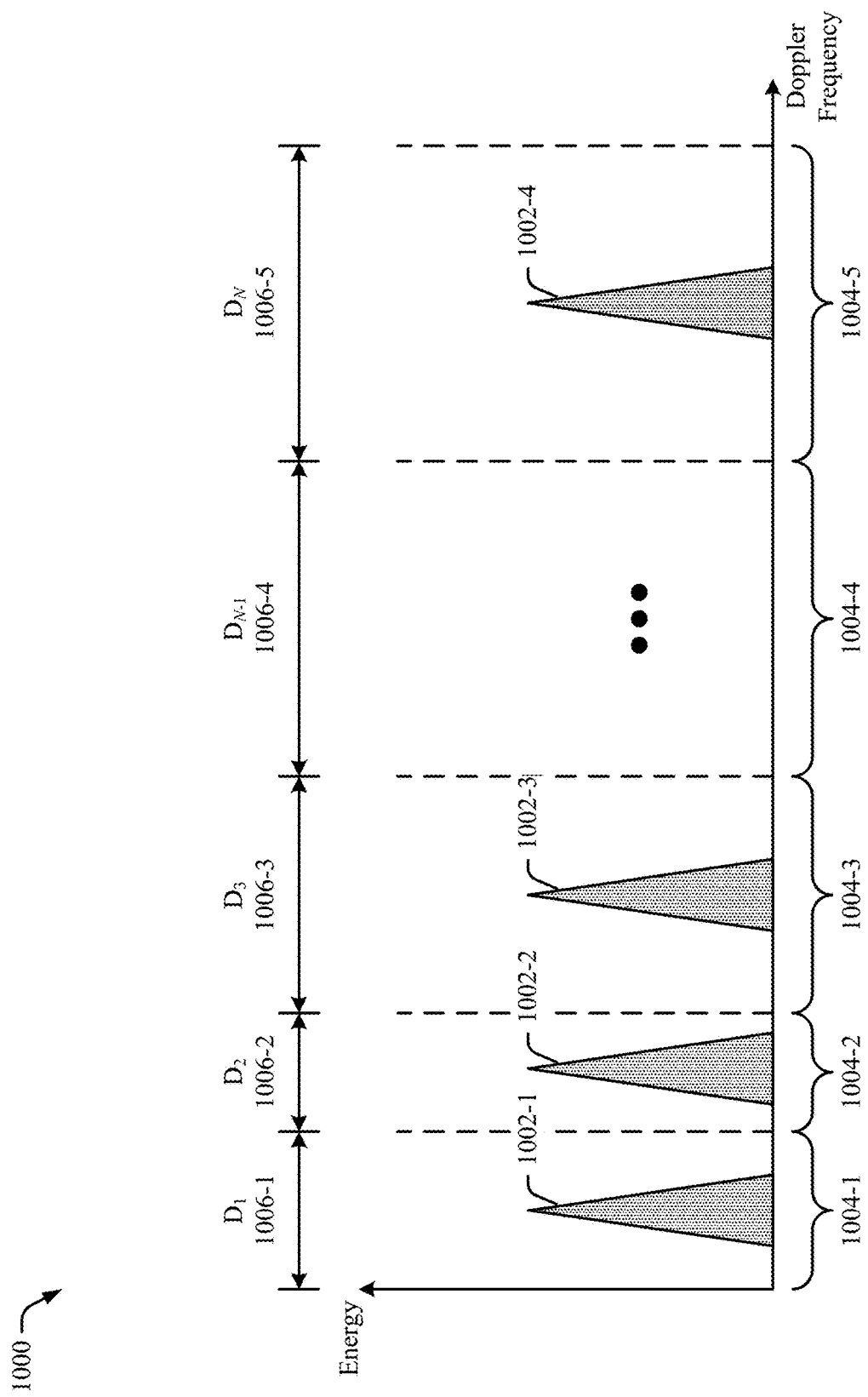

FIG. 10 illustrates an example graphical representation 1000 of the association of channels and sectors in a radar system using FDM with polyphase shifters. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2.

The graphical representation 1000 illustrates energy of received EM signals as a y-axis and a corresponding Doppler frequency of the received EM signals as an x-axis. The received EM signals include N channels 1002, which are represented in FIG. 10 by the triangular peaks corresponding to an actual detection or aliased detection within each channel.

The radar system 104 or the spectrum analysis module 122 divides the received EM signals into M sectors 1004, which have a non-uniform size 1006. The sectors 1004 represent a range of frequencies within the Doppler-frequency spectrum for the received EM signals. The radar system 104 or the spectrum analysis module 122 selects the number M of sectors 1004 to be equal to the number N of channels 1002 (e.g., M=N). Consider that the Doppler spectrum is divided into six sectors 1004 (e.g., M equals six), each sector 1004 will have a corresponding size 1006 that is different for each sector 1004 (e.g., $D_1 \neq D_2 \neq D_3 \neq D_4 \neq D_5 \neq D_6$). The radar system 104 or the spectrum analysis module 122 associates or places the channels 1002 in separate sectors 1004, with one channel 1002 per sector 1004. Because each sector 1004 has a different size 1006, the channels 1002 are asymmetrical and Doppler ambiguity in resolving detections of the objects 110 is avoided.

Figure 11:
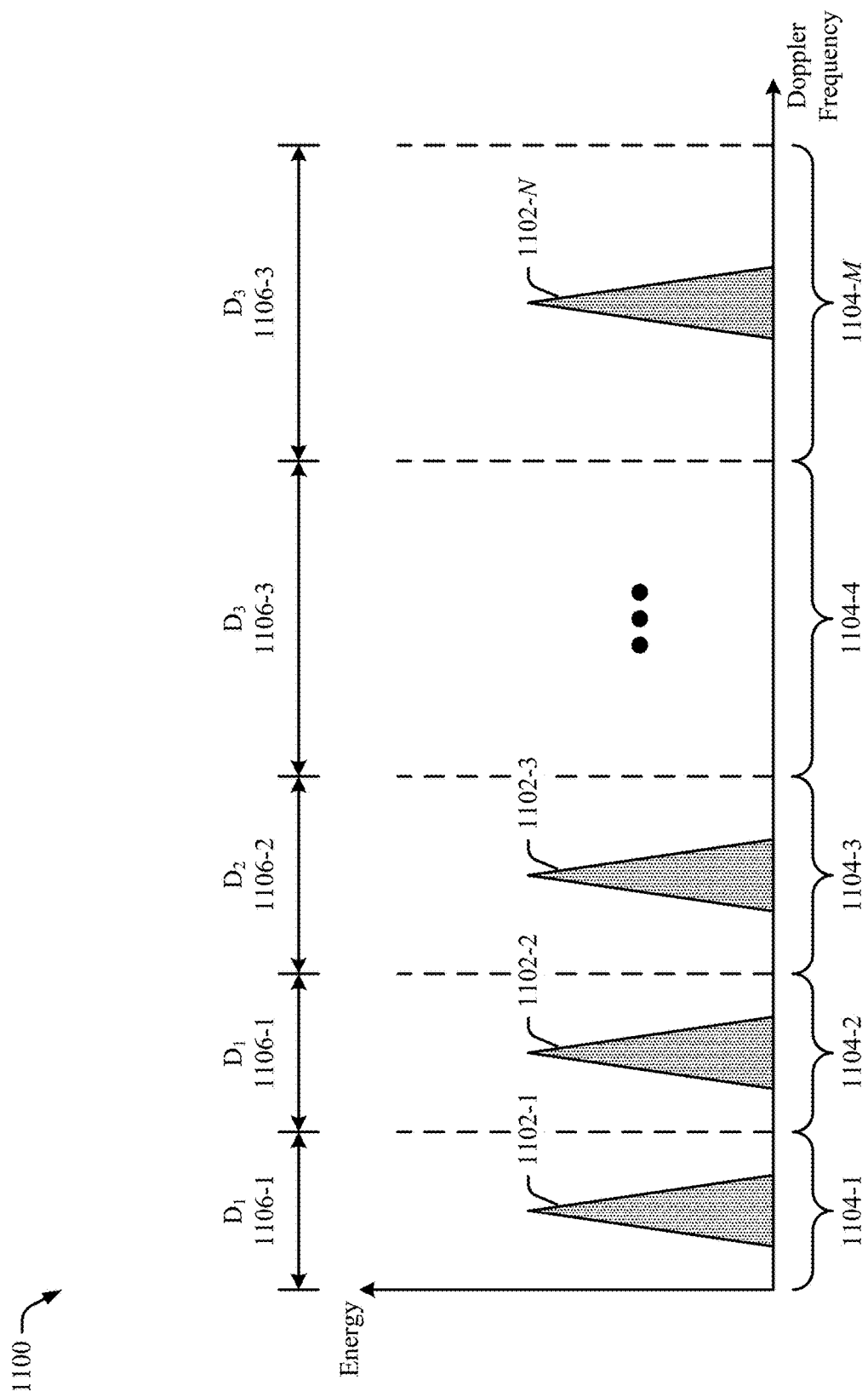

FIG. 11 illustrates an example graphical representation 1100 of the association of channels and sectors in a radar system using FDM with polyphase shifters. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2.

The graphical representation 1100 illustrates energy of received EM signals as a y-axis and a corresponding Doppler frequency of the received EM signals as an x-axis. The EM signals include N channels 1102, which are represented in FIG. 11 by the triangular peaks corresponding to an actual detection or aliased detection within each channel.

The radar system 104 or spectrum analysis module 122 divides the received EM signals into M sectors 1104, which have a combination of uniform and non-uniform sizes or spacing 1106. In other words, some subset of sectors 1104 have a uniform size 1106 and one or more other subsets of 1104 have a different size 1106. The sectors 1104 represent a range of frequencies within the Doppler-frequency spectrum for the EM signals. The radar system 104 or the spectrum analysis module 122 selects the number M of sectors 1104 to be equal to the number N of channels 1102 (e.g., M=N). Consider that the Doppler spectrum is divided into six sectors 1104 (e.g., M equals six), sectors 1104-1 and 1104-2 can have a first spacing $D_1$ 1106-1, sector 1104-3 can have a second spacing $D_2$ 1106-2, and sectors 1104-4, 1104-5, and 1104-6 can have a third spacing $D_3$ 1106-3. The radar system 104 or the spectrum analysis module 122 associates or places the channels 1102 in separate sectors, with one channel 1102 per sector 1104. Because of the combination of uniform and non-uniform sizes 1006, the channels 1002 are asymmetrical and Doppler ambiguity in resolving detections of the objects 110 is avoided.

Figure 12:
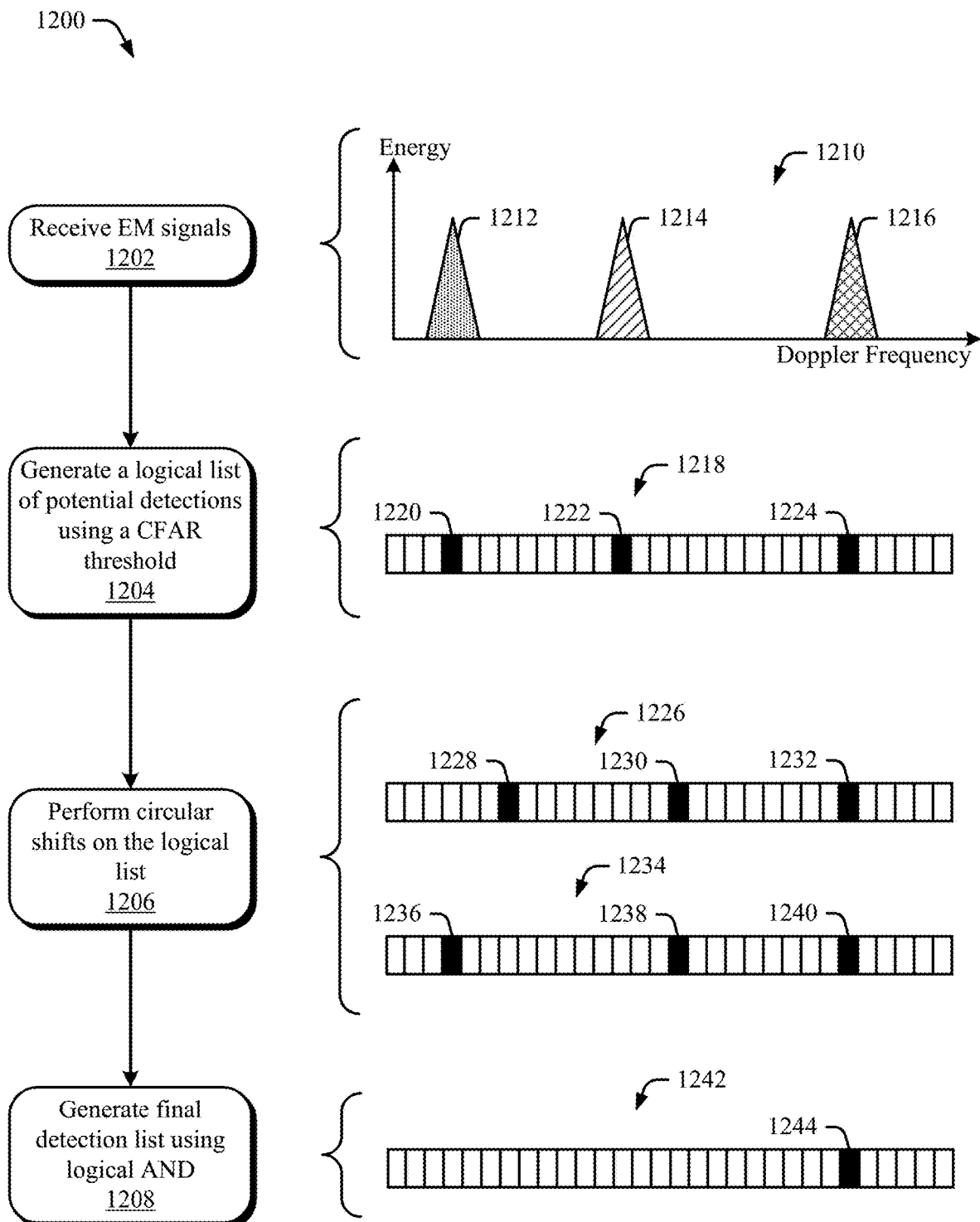
FIGS. 12-17 illustrate example flowcharts for a radar system that uses FDM with polyphase shifters to perform non-coherent integration and determine actual detections associated with objects.

FIG. 12 illustrates an example flowchart 1200 for a radar system that uses FDM with polyphase shifters to perform non-coherent integration and determine actual detections associated with objects. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines actual detections for the objects 110 surrounding the vehicle 102.

At 1202, the radar system 104 receives EM energy. For example, the receivers 114 of the radar system 104 can receive EM energy reflected by the objects 110. The objects 110 can reflect EM energy transmitted by the transmitters 112. The radar system 104 also divides the Doppler frequencies of the received EM energy into sectors and associates the channels with the sectors, as described in greater detail with respect to FIGS. 8 through 11. Graphical plot 1210 illustrates the potential detections 1212, 1214, and 1216 in a three-channel radar system. The graphical plot 1210 illustrates the energy associated with the potential detections 1212, 1214, and 1216 versus the corresponding Doppler frequency.

At 1204, the radar system 104 generates a first logical list of potential detections for a first channel of the channels using a constant false alarm rate (CFAR) threshold. The CFAR threshold is used to detect object reflections against a background of noise, clutter, and interference in the received EM signals for the single channel. In this approach, the CFAR threshold can be reduced or smaller than a typical CFAR threshold value because a single channel of the channels is being analyzed. For example, the radar system 104 can use a reduced CFAR to account for the gain difference in the received EM signal for a single channel compared to the non-coherent integrated gain from multiple channels.

The first logical list indicates the potential detections within respective Doppler bins that include a peak with EM energy greater than the CFAR threshold. In other words, a logical detection (e.g., the logical detections 1220, 1222, and 1224) is identified by any energy peaks in the received EM signal that are larger than the reduced CFAR threshold. The logical list represents Doppler bins within the Doppler-frequency spectrum. The logical detection list 1218 illustrates a logical detection 1220 in a Doppler bin that corresponds to the center Doppler frequency of the potential detection 1212. Similarly, logical detection 1222 and 1224 correspond to the center Doppler frequencies of the potential detections 1214 and 1216, respectively.

At 1206, the radar system 104 or the non-coherent integrator 124 performs, based on the sectors, one or more circular shifts on the first logical list of potential detections to generate additional logical lists. The number of circular shifts is equal to the number N of channels minus one (e.g., N−1). In the depicted implementation, two circular shifts are performed on the logical detection list 1218, resulting in logical detections lists 1226 and 1234. The logical detection list 1226 includes logical detections 1228, 1230, and 1232. The logical detection list 1234 includes logical detections 1236, 1238, and 1240.

At 1208, the radar system 104 or the non-coherent integrator 124 determines or generates a final detection list of actual detections using a logical AND operator over the logical lists. For example, the radar system 104 or the non-coherent integrator 124 determines the actual detections of the objects 110 by performing a logical AND operation on the logical lists 1218, 1226, and 1234 at each Doppler bin of the logical lists. As illustrated in the final detection list 1242, an actual detection 1244 is identified at a particular Doppler bin, which corresponds to the logical detections 1224, 1232, and 1240. By using a single channel and circular shifts thereof, the radar system 104 can process the radar data faster.

Figure 13:
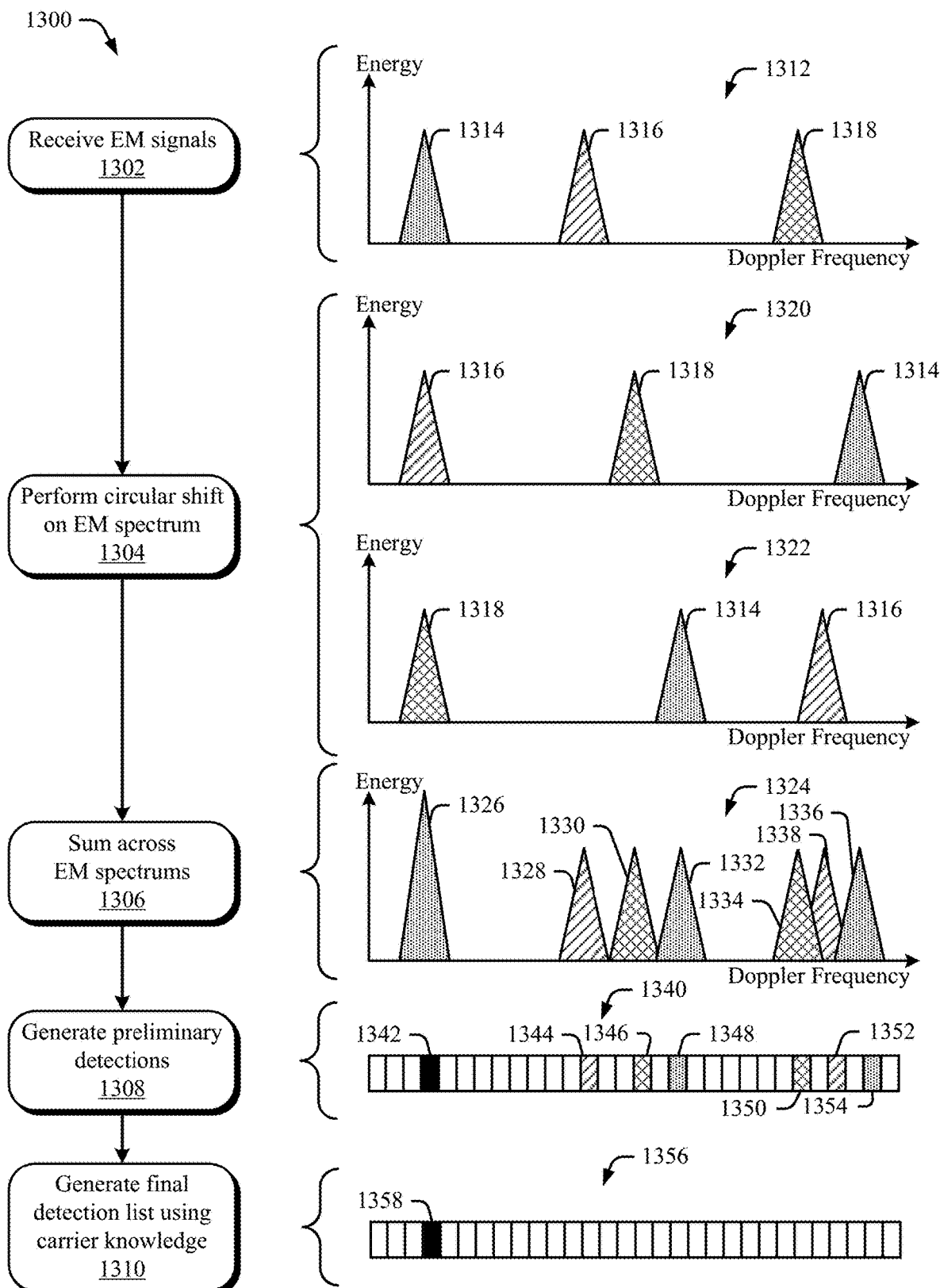

FIG. 13 illustrates another example flowchart 1300 for a radar system that uses FDM with polyphase shifters to perform non-coherent integration and determine actual detections associated with objects. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines actual detections for the objects 110 surrounding the vehicle 102.

At 1302, the radar system 104 receives EM energy. For example, the receivers 114 of the radar system 104 can receive EM energy reflected by the objects 110. The objects 110 can reflect EM energy transmitted by the transmitters 112. The radar system 104 can generate a first EM spectrum of the received EM signals for a first channel of the channels. The radar system 104 also divides the Doppler frequencies of the received EM energy into sectors and associates the channels with the sectors as described in greater detail with respect to FIGS. 8 through 11. Graphical plot 1308 illustrates the potential detections 1310, 1312, and 1314 in a three-channel radar system. The graphical plot 1308 illustrates the energy associated with the potential detections 1310, 1312, and 1314 versus the corresponding Doppler frequency.

At 1304, the radar system 104 performs, based on the sectors, one or more circular shifts on the first EM spectrum to generate additional EM spectrums of the received EM signals. The number of circular shifts is equal to the number N of channels minus one (e.g., N−1. In the depicted implementation, two circular shifts are performed on the graphical plot 1308, resulting in graphical plots 1316 and 1318. The graphical plots 1316 and 1318 illustrate the potential detections 1310, 1312, and 1314 at different center Doppler frequencies after the corresponding circular shift. For example, the graphical plot 1316 illustrates a circular shift of the graphical plot 1308, and the graphical plot 1318 illustrates a circular shift of the graphical plot 1316.

At 1306, the radar system 104 determines, across the first and additional EM spectrums, a sum of EM energy levels at each Doppler bin of the EM spectrum. For example, the radar system 104 can sum across the graphical plots 1308, 1316, and 1318 at each Doppler bin to generate the graphical plot 1320. The graphical plot 1320 includes potential detections 1322, 1328, 1330, 1332, 1334, and 1336. The potential detection 1322 includes the sum of the EM energy associated with the potential detections 1310, 1312, and 1314. In this way, the actual location of the object 110 within the Doppler-frequency spectrum gets full integration, resulting in a higher gain for the potential detection 1322. The aliased locations (e.g., the potential detections 1328-1338) have a relatively smaller gain.

At 1308, the radar system 104 generates a logical list 1340 (e.g., a logical detection list) of potential detections using a CFAR threshold. The CFAR threshold is used to detect object reflections against a background of noise, clutter, and interference in the received EM signals for the single channel. The logical list 1340 indicates the potential detections within respective Doppler bins that include a peak with EM energy greater than the CFAR threshold. In other words, a logical detection (e.g., the logical detections 1342, 1344, 1346, 1348, 1350, 1352, and 1354) is identified by any energy peaks in the received EM signal that are larger than the reduced CFAR threshold. The logical list represents Doppler bins within the Doppler-frequency spectrum. The logical detection list 1340 illustrates a logical detection in a Doppler bin that corresponds to the center Doppler frequency of each potential detection.

At 1310, the radar system 104 determines the actual detections of the objects 110 by identifying the aliased detects based on the association of each of the channels of received EM signals to the respective sector. For example, the radar system 104 identifies the actual detection 1358 in the final detection list 1356. The radar system 104 can recursively select a potential detection from the preliminary detections as the actual final detection and identify potential aliased locations based on the channel placement. The recursive process is continued until a final detection is selected that identifies the appropriate number of aliased detections. By using a summation of circular shifts of the single-channel data, the radar system 104 generates a higher gain for actual detections, making it easier to identify actual detections among noise, weak signals, and aliased detections.

Figure 14:
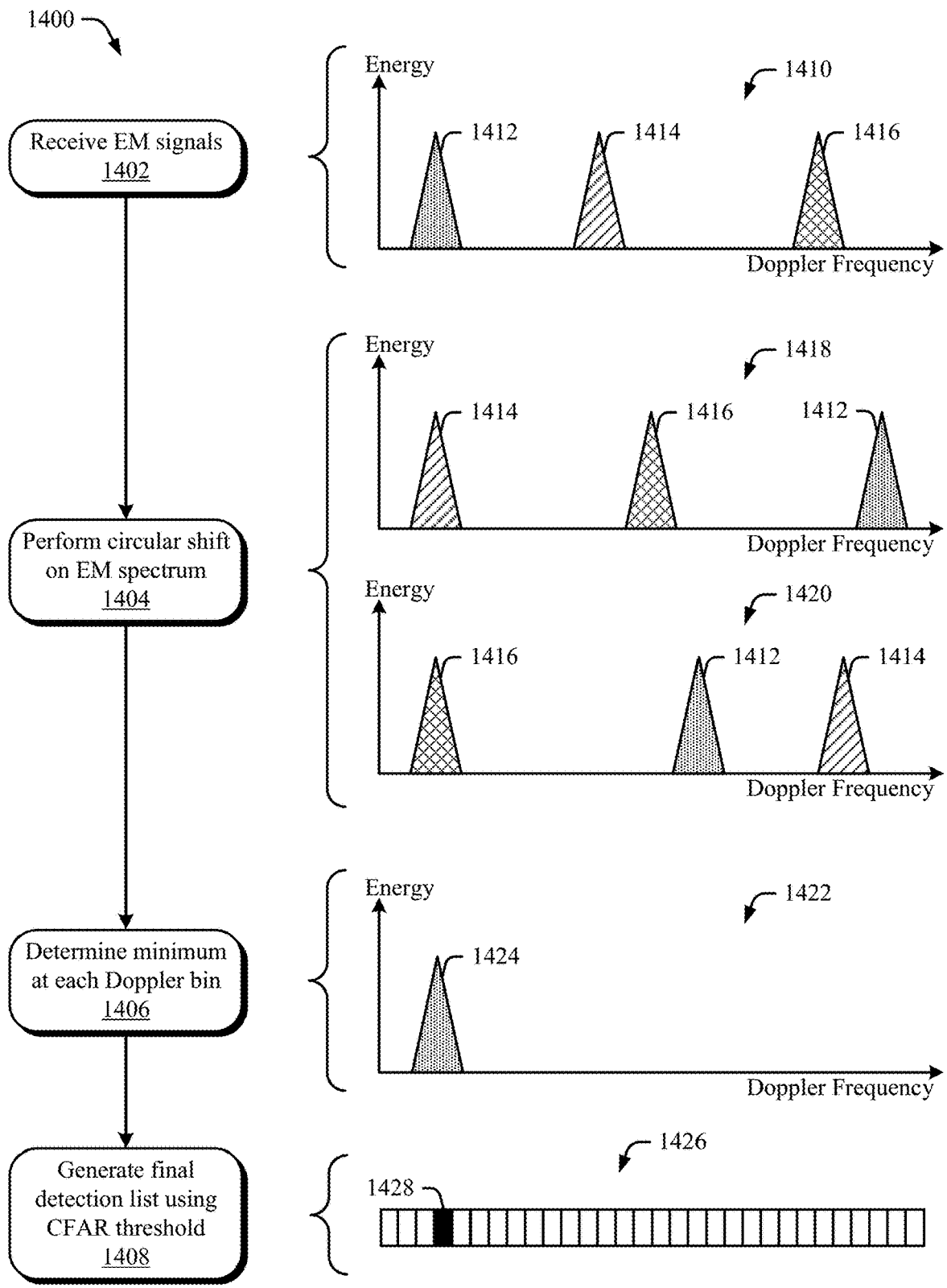

FIG. 14 illustrates another example flowchart 1400 for a radar system that uses FDM with polyphase shifters to perform non-coherent integration and determine actual detections associated with objects. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines a Doppler velocity of objects 110 surrounding the vehicle 102.

At 1402, the radar system 104 receives EM energy. For example, the receivers 114 of the radar system 104 can receive EM energy reflected by the objects 110. The objects 110 can reflect EM energy transmitted by the transmitters 112. The radar system 104 can generate a first EM spectrum of the received EM signals for a first channel of the channels. The radar system 104 also divides the Doppler frequencies of the received EM energy into sectors and associates the channels with the sectors as described in greater detail with respect to FIGS. 8 through 11. Graphical plot 1410 illustrates the potential detections 1412, 1414, and 1416 in a three-channel radar system of a single channel. The graphical plot 1410 illustrates the energy associated with the potential detections 1412, 1414, and 1416 versus the corresponding Doppler frequency.

At 1404, the radar system 104 performs, based on the sectors, one or more circular shifts on the first EM spectrum to generate additional EM spectrums of the received EM signals. The number of circular shifts is equal to the number N of channels minus one (e.g., N−1). In the depicted implementation, two circular shifts are performed on the graphical plot 1410, resulting in graphical plots 1418 and 1420. The graphical plots 1418 and 1420 illustrate the potential detections 1412, 1414, and 1416 at different center Doppler frequencies after the corresponding circular shift. For example, the graphical plot 1418 illustrates a circular shift of the graphical plot 1410 and the graphical plot 1420 illustrates a circular shift of the graphical plot 1418.

At 1406, the radar system 104 determines, across the first and additional EM spectrums, a minimum EM energy level at each Doppler bin of the EM spectrum. For example, the radar system 104 can take a minimum across the graphical plots 1410, 1418, and 1420 at each Doppler bin to generate graphical plot 1422. The graphical plot 1422 includes a potential detection 1424. In this way, the actual location of the object 110 within the Doppler spectrum is identified because the aliased detections do not appear in each graphical plot at the same Doppler bin across each graphical plot.

At 1408, the radar system 104 generates a final detection list 1426 (e.g., a logical detection list) and determines the actual detections of the objects 110. The actual detections are determined by determining whether the minimum EM energy level at a respective Doppler bin is greater than a CFAR threshold. The final detection list 1426 indicates in which Doppler bins an actual detection was identified. An actual detection (e.g., the actual detection 1428) is identified by any energy peaks in the graphical plot 1422 that is larger than the CFAR threshold. The final detection list 1426 illustrates a logical detection in a Doppler bin that corresponds to the center Doppler frequency of each potential detection.

Figure 15:
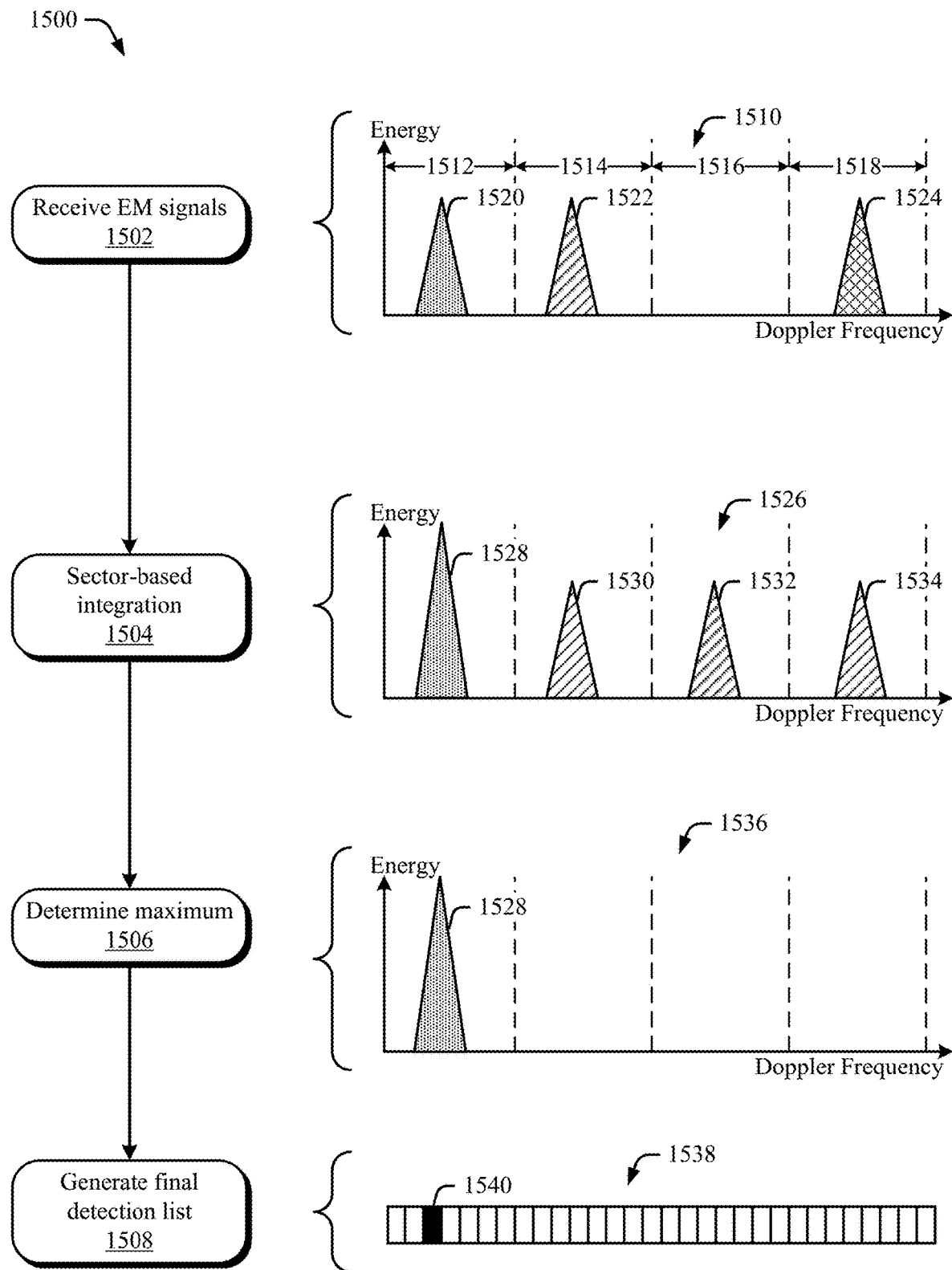

FIG. 15 illustrates another example flowchart 1500 for a radar system that uses FDM with polyphase shifters to perform non-coherent integration and determine actual detections associated with objects. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines a Doppler velocity of objects 110 surrounding the vehicle 102.

At 1502, the radar system 104 receives EM energy. For example, the receivers 114 of the radar system 104 can receive EM energy reflected by the objects 110. The objects 110 can reflect EM energy transmitted by the transmitters 112. The radar system 104 can generate a first EM spectrum of the received EM signals for a first channel of the channels. The radar system 104 also divides the Doppler frequencies of the received EM energy into equally-sized sectors and associates the channels with the sectors as described in greater detail with respect to FIG. 9. Graphical plot 1510 illustrates the potential detections 1520, 1522, and 1524 in a three-channel radar system of a single channel. The graphical plot 1510 illustrates the energy associated with the potential detections 1520, 1522, and 1524 versus the corresponding Doppler frequency.

At 1504, the radar system 104 or the non-coherent integrator 124 determines, using the first EM spectrum and for each sector, a sector-based integration of the EM energy. The radar system 104 or the non-coherent integrator 124 can perform sector-based integration or summation on the EM energy received by the single channel. The number of sectors integrated together is equal to the number N of channels minus one (e.g., N−1). The number of sector-based integrations is equal to the number N of channels. In the depicted implementation, each sector-based integration includes three consecutive sectors. For example, for a potential target in the sector 1512, the radar system 104 integrates the EM energy in the sectors 1512, 1514, and 1516 together. For a potential target in the sector 1514, the radar system 104 integrates the EM energy in the sectors 1514, 1516, and 1518. For a potential target in the sector 1516, the radar system 104 integrates the EM energy in the sectors 1516, 1518, and 1512. And for a potential target in the sector 1518, the radar system 104 integrates the EM energy in the sectors 1518, 1512, and 1514.

Graphical plot 1526 illustrates the result of the sector-based integration, which includes potential detections 1528, 1530, 1532, and 1534. In this way, the actual location of the object 110 within the Doppler spectrum gets a larger integration, resulting in a higher gain for the corresponding potential detection 1528. The aliased locations (e.g., the potential detections 1530, 1532, and 1534) have a relatively smaller gain.

At 1506, the radar system 104 or non-coherent integrator 124 determines a maximum EM energy level for the sector-based integration of the EM energy. For example, the radar system 104 can take a maximum across the graphical plot 1526 to generate the graphical plot 1536. The graphical plot 1536 includes the potential detection 1528. In this way, the actual location of the object 110 within the Doppler-frequency spectrum is identified because the aliased detections do not obtain the same integrated gain as the actual detection.

At 1508, the radar system 104 generates a final detection list 1538 (e.g., a logical detection list) using a CFAR threshold to determine the actual detections. The final detection list 1538 indicates in which Doppler bin an actual detection was identified. An actual detection (e.g., the actual detection 1540) is identified by any energy peaks in the graphical plot 1536 that are larger than the CFAR threshold. The final detection list 1538 illustrates a logical detection in a Doppler bin that corresponds to the center Doppler frequency of each potential detection.

Figure 16:
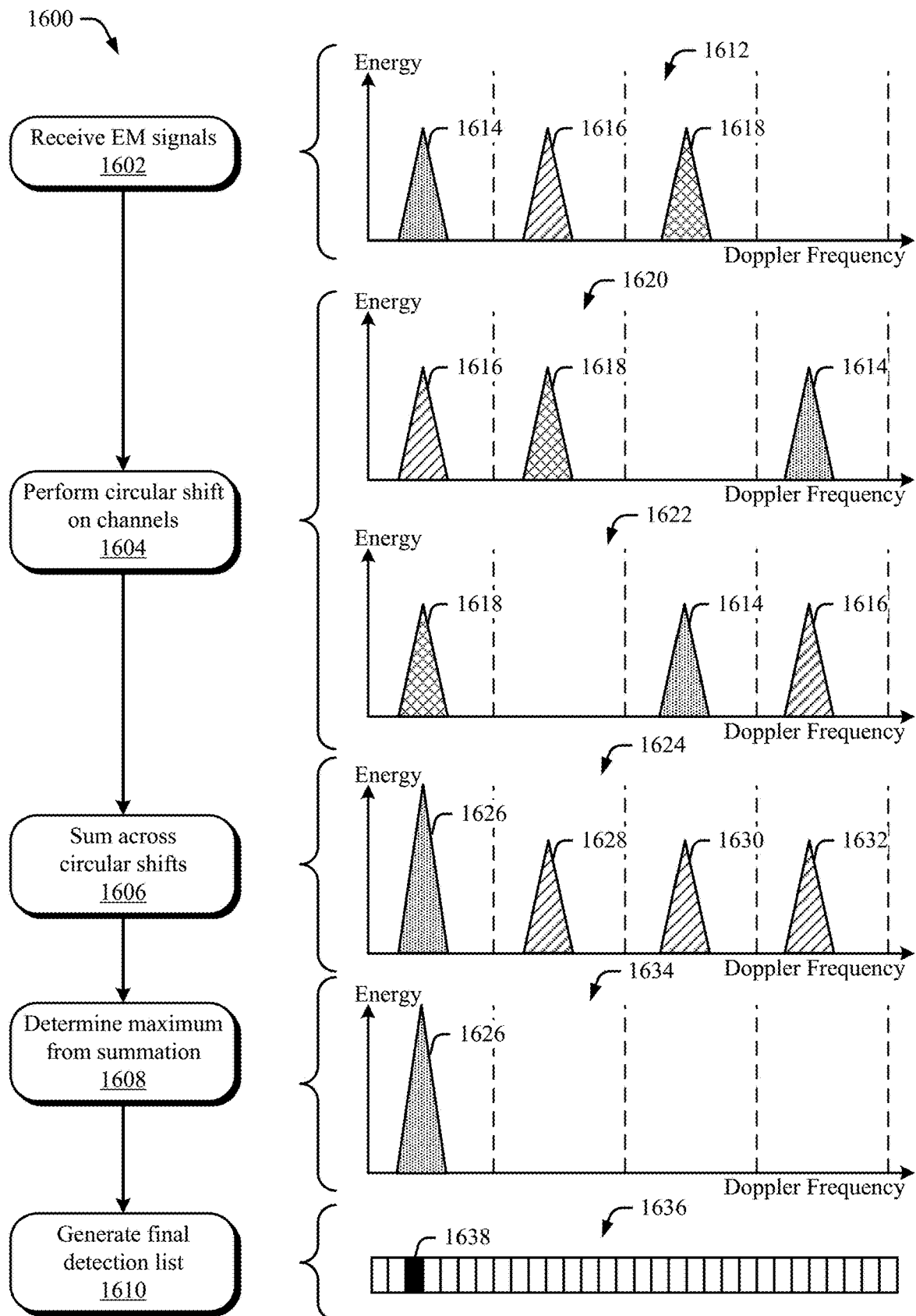

FIG. 16 illustrates another example flowchart 1600 for a radar system that uses FDM with polyphase shifters to perform non-coherent integration and determine actual detections associated with objects. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines a Doppler velocity of objects 110 surrounding the vehicle 102.

At 1602, the radar system 104 receives EM energy. For example, the receivers 114 of the radar system 104 can receive EM energy reflected by the objects 110. The objects 110 can reflect EM energy transmitted by the transmitters 112. The radar system 104 can generate a first EM spectrum of the received EM signals for a first channel of the channels. The radar system 104 also divides the Doppler frequencies of the received EM energy into equally-sized sectors and associates the channels with the sectors as described in greater detail with respect to FIG. 9. Graphical plot 1612 illustrates the potential detections 1614, 1616, and 1618 in a three-channel radar system of a single channel. The graphical plot 1612 illustrates the energy associated with the potential detections 1614, 1616, and 1618 versus the corresponding Doppler frequency.

At 1604, the radar system 104 or the non-coherent integrator 124 performs, based on the sectors, one or more circular shifts on the first EM spectrum to generate additional EM spectrums of the received EM signals. The number of circular shifts is equal to the number N of channels minus one (e.g., N−1). In the depicted implementation, two circular shifts are performed on the graphical plot 1612, resulting in graphical plots 1620 and 1622. The graphical plots 1620 and 1622 illustrate the potential detections 1614, 1616, and 1618 at different center Doppler frequencies after the corresponding circular shift. For example, the graphical plot 1620 illustrates a circular shift of the graphical plot 1612 and the graphical plot 1622 illustrates a circular shift of the graphical plot 1620.

At 1606, the radar system 104 or the non-coherent integrator 124 determines, using the first and additional EM spectrums and for each sector, a sector-based integration of EM energy. The sector-based integration represents a sum of the EM energy of the respective sector across the first and additional EM spectrums. For example, the radar system 104 can sum across the graphical plots 1612, 1620, and 1622 at each Doppler bin to generate the graphical plot 1624. The graphical plot 1624 includes potential detections 1626, 1628, 1630, and 1632. The potential detection 1626 includes the sum of the EM energy associated with the potential detections 1614, 1616, and 1618. In this way, the actual location of the object 110 within the Doppler spectrum gets full integration, resulting in a higher gain for the potential detection 1626. The aliased locations (e.g., the potential detections 1628, 1630, and 1632) have a relatively smaller gain.

At 1608, the radar system 104 or the non-coherent integrator 124 determines a maximum EM energy level for the sector-based integration of EM energy. For example, the radar system 104 can take the maximum across the graphical plot 1624 to generate the graphical plot 1634. The graphical plot 1634 includes the potential detection 1626. In this way, the actual location of the object 110 within the Doppler-frequency spectrum is identified because the aliased detections result in a lower summed gain.

At 1610, the radar system 104 generates a final detection list 1636 (e.g., a logical detection list) of the actual detections. The final detection list 1636 indicates in which Doppler bins an actual detection 1638 was identified. The final detection list 1636 illustrates a logical detection in a Doppler bin that corresponds to the center Doppler frequency of the actual detection 1638.

Figure 17:
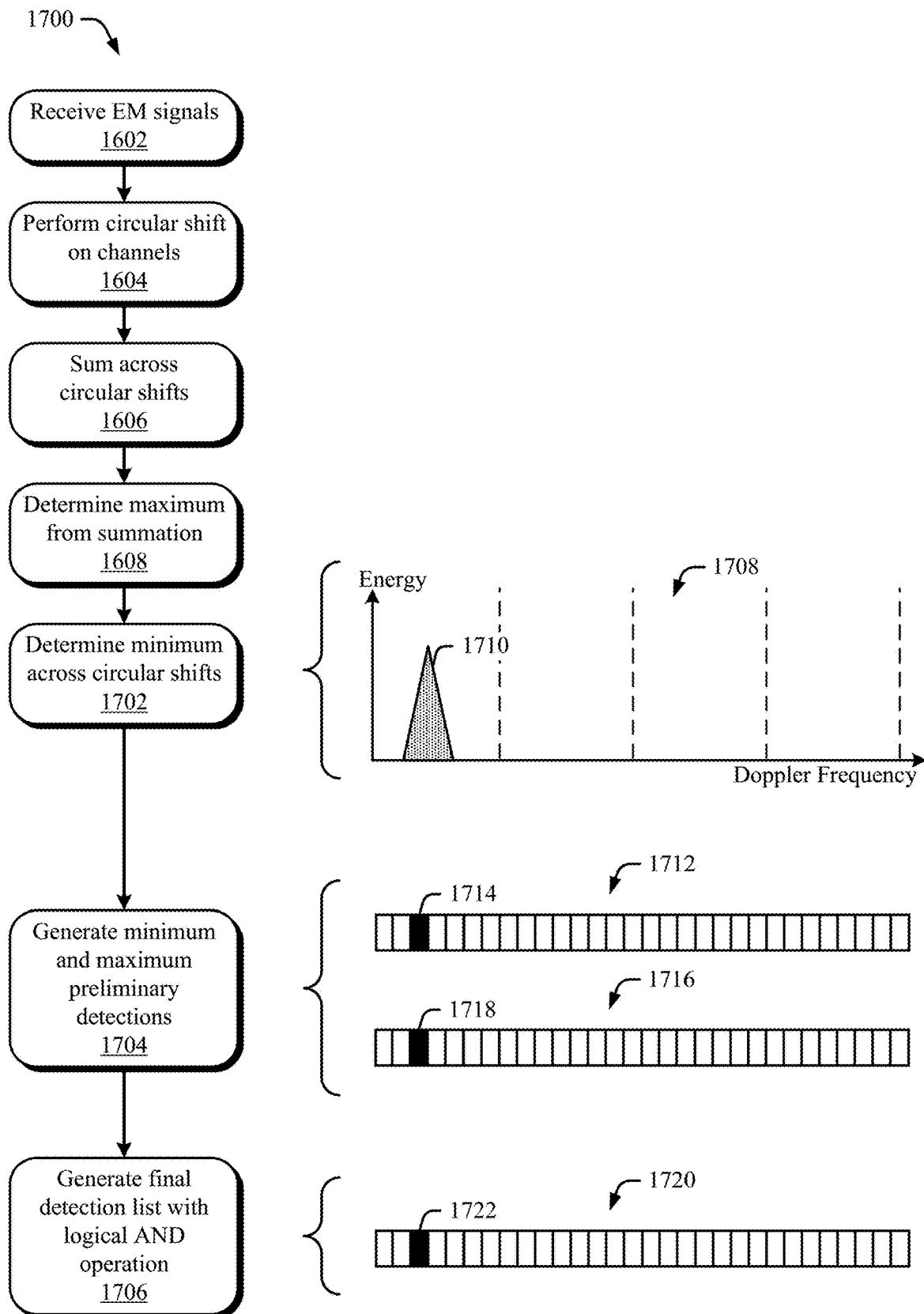

FIG. 17 illustrates another example flowchart 1700 for a radar system that uses FDM with polyphase shifters to perform non-coherent integration and determine actual detections associated with objects. For example, the radar system can be the radar system 104 of FIGS. 1 and 2, the radar system 302 of FIG. 3, the radar system 402 of FIG. 4-1, the radar system 412 of FIG. 4-2, the radar system 502 of FIG. 5-1, or the radar system 512 of FIG. 5-2 that determines a Doppler velocity of objects 110 surrounding the vehicle 102. The flowchart 1700 includes the same four operations (e.g., the operations 1602, 1604, 1606, and 1608) as the flowchart 1600.

At 1602, the radar system 104 receives EM energy. For example, the receivers 114 of the radar system 104 can receive EM energy reflected by the objects 110. The objects 110 can reflect EM energy transmitted by the transmitters 112. The radar system 104 can generate a first EM spectrum of the received EM signals for a first channel of the channels. The radar system 104 also divides the Doppler frequencies of the received EM energy into equally-sized sectors and associates the channels with the sectors as described in greater detail with respect to FIG. 9. Graphical plot 1612 illustrates the potential detections 1614, 1616, and 1618 in a three-channel radar system of a single channel. The graphical plot 1612 illustrates the energy associated with the potential detections 1614, 1616, and 1618 versus the corresponding Doppler frequency.

At 1604, the radar system 104 or the non-coherent integrator 124 performs, based on the sectors, one or more circular shifts on the first EM spectrum to generate additional EM spectrums of the received EM signals. The number of circular shifts is equal to the number N of channels minus one (e.g., N−1). In the depicted implementation, two circular shifts are performed on the graphical plot 1612, resulting in graphical plots 1620 and 1622. The graphical plots 1620 and 1622 illustrate the potential detections 1614, 1616, and 1618 at different center Doppler frequencies after the corresponding circular shift. For example, the graphical plot 1620 illustrates a circular shift of the graphical plot 1612 and the graphical plot 1622 illustrates a circular shift of the graphical plot 1620.

At 1606, the radar system 104 or the non-coherent integrator 124 determines, using the first and additional EM spectrums and for each sector, a sector-based integration of EM energy. The sector-based integration represents a sum of the EM energy of the respective sector across the first and additional EM spectrums. For example, the radar system 104 can sum across the graphical plots 1612, 1620, and 1622 at each Doppler bin to generate the graphical plot 1624. The graphical plot 1624 includes potential detections 1626, 1628, 1630, and 1632. The potential detection 1626 includes the sum of the EM energy associated with the potential detections 1614, 1616, and 1618. In this way, the actual location of the object 110 within the Doppler spectrum gets full integration, resulting in a higher gain for the potential detection 1626. The aliased locations (e.g., the potential detections 1628, 1630, and 1632) have a relatively smaller gain.

At 1608, the radar system 104 or the non-coherent integrator 124 determines a maximum EM energy level for the sector-based integration of EM energy. For example, the radar system 104 can take the maximum across the graphical plot 1624 to generate the graphical plot 1634. The graphical plot 1634 includes the potential detection 1626. In this way, the actual location of the object 110 within the Doppler-frequency spectrum is identified because the aliased detections result in a lower summed gain.

At 1702, the radar system 104 or the non-coherent integrator 124 determines a minimum EM energy level at each Doppler bin of the EM spectrum. For example, the radar system 104 or the non-coherent integrator 124 can take a minimum across the graphical plots 1612, 1620, and 1622 at each Doppler bin to generate the graphical plot 1708. The graphical plot 1708 includes a potential detection 1710. In this way, the actual location of the object 110 within the Doppler spectrum is identified because the aliased detections do not appear in each graphical plot at the same Doppler bin across each graphical plot.

At 1704, the radar system 104 or the non-coherent integrator 124 generates a preliminary minimum detection list 1712 and a preliminary maximum detection list 1716 using a CFAR threshold. The preliminary minimum detection list 1712 includes a potential detection 1714. The preliminary maximum detection list 1716 includes a potential detection 1718. The CFAR threshold is used to detect object reflections against a background of noise, clutter, and interference in the received EM signals for the single channel. The preliminary minimum detection list 1712 indicates the potential detections within respective Doppler bins for the graphical plot 1708 that include a peak with EM energy greater than the CFAR threshold. The preliminary maximum detection list 1716 indicates the potential detections within respective Doppler bins for the graphical plot 1708 that include a peak with EM energy greater than the CFAR threshold.

At 1706, the radar system 104 generates a final detection list 1720 of actual detections using a logical AND operator on the preliminary minimum detection list 1712 and the preliminary maximum detection list 1716 at each Doppler bin. The final detection list 1720 indicates in which Doppler bins an actual detection 1722 was identified. The final detection list 1720 illustrates a logical detection in a Doppler bin that corresponds to the center Doppler frequency of the actual detection 1722.

EXAMPLES

In the following section, examples are provided.

Example 1

A radar system comprising: multiple transmitters configured to transmit electromagnetic (EM) signals in a frequency-division multiplexing (FDM) scheme; multiple receivers configured to receive EM signals reflected by one or more objects; multiple polyphase shifters operably connected to the multiple transmitters, the multiple receivers, or a combination thereof, the multiple polyphase shifters configured to introduce at least three potential phase shifts; and a processor configured to control the multiple polyphase shifters to introduce a phase shift to at least one of the transmitted EM signals or the received EM signals.

Example 2

The radar system of example 1, wherein: the multiple transmitters comprise a first number of transmitters; the multiple receivers comprise a second number of receivers, the second number being equal or not equal to the first number; the multiple polyphase shifters comprise a third number of polyphase shifters, the third number being equal to the first number, the second number, or a sum of the first number and the second number; and the received EM signals comprise a fourth number of channels, the fourth number being equal to a product of the first number and the second number.

Example 3

The radar system of example 2, wherein: the multiple polyphase shifters are operably connected to the multiple transmitters; and the third number is equal to the first number.

Example 4

The radar system of example 2, wherein: the multiple polyphase shifters are operably connected to the multiple receivers; and the third number is equal to the second number.

Example 5

The radar system of example 2, wherein: the multiple polyphase shifters are operably connected to the multiple transmitters and the multiple receivers; and the third number is equal to the sum of the first number and the second number.

Example 6

The radar system of example 2, wherein the processor is further configured to: divide a Doppler-frequency spectrum of the received EM signals into a fifth number of sectors, the sectors representing a respective frequency range within the Doppler-frequency spectrum and being equally sized within the Doppler-frequency spectrum, the fifth number being equal to or greater than the fourth number plus one; and associate each of the channels of the received EM signals to a respective sector of the sectors, at least one of the sectors not being associated with a channel of the received EM signals, the association of the channels to the sectors being configured to form an asymmetrical spectrum.

Example 7

The radar system of example 2, wherein the processor is further configured to: divide a Doppler-frequency spectrum of the received EM signals into the fourth number of sectors, the sectors representing a respective frequency range within the Doppler-frequency spectrum and being unequally sized within the Doppler-frequency spectrum; and associate each of the channels of the received EM signals to a respective sector of the sectors, the association of the channels to the unequal sectors being configured to form an asymmetrical spectrum.

Example 8

The radar system of example 2, wherein the processor is further configured to: divide a Doppler-frequency spectrum of the received EM signals into the fourth number of sectors, the sectors representing a respective frequency range within the Doppler-frequency spectrum, a subset of the sectors being equally sized within the Doppler-frequency spectrum and another subset of the sectors being unequally sized within the Doppler-frequency spectrum; and associate each of the channels of the received EM signals to a respective sector of the sectors, the association of the channels to the sectors being configured to form an asymmetrical spectrum.

Example 9

The radar system of any preceding example, wherein the processor is further configured to control the multiple polyphase shifters to dynamically adjust the phase shift introduced to at least one of the transmitted EM signals or the received EM signals.

Example 10

The radar system of any preceding example, wherein the multiple transmitters and the multiple receivers are configured to operate as part of a multiple-input and multiple-output (MIMO) radar approach.

Example 11

The radar system of any preceding example, wherein the radar system is configured to be installed on an automobile.

Example 12

A computer-readable storage media comprising computer-executable instructions that, when executed, cause a processor of a radar system to: transmit, via multiple transmitters of the radar system, electromagnetic (EM) signals in a frequency-division multiplexing (FDM) scheme; receive, via multiple receivers of the radar system, EM signals reflected by one or more objects; and control multiple polyphase shifters to introduce a phase shift to at least one of the transmitted EM signals or the received EM signals, the multiple polyphase shifters being operably connected to the multiple transmitters, the multiple receivers, or a combination thereof, the introduced phase shift comprising one of at least three potential phase shifts.

Example 13

The computer-readable storage media of example 12, wherein: the multiple transmitters comprise a first number of transmitters; the multiple receivers comprise a second number of receivers, the second number being equal or not equal to the first number; the multiple polyphase shifters comprise a third number of polyphase shifters, the third number being equal to the first number, the second number, or a sum of the first number and the second number; and the received EM signals comprise a fourth number of channels.

Example 14

The computer-readable storage media of example 13, wherein: the multiple polyphase shifters are operably connected to the multiple transmitters; and the third number is equal to the first number.

Example 15

The computer-readable storage media of example 13, wherein: the multiple polyphase shifters are operably connected to the multiple receivers; and the third number is equal to the second number.

Example 16

The computer-readable storage media of example 13, wherein: the multiple polyphase shifters are operably connected to the multiple transmitters and the multiple receivers; and the third number is equal to the sum of the first number and the second number.

Example 17

The computer-readable storage media of example 13, wherein the instructions, when executed, further cause the processor of the radar system to: divide a Doppler-frequency spectrum of the received EM signals into a fifth number of sectors, the sectors representing a respective frequency range within the Doppler-frequency spectrum and being equally sized within the Doppler-frequency spectrum, the fifth number being equal to or greater than the fourth number plus one; and associate each of the channels of the received EM signals to a respective sector of the sectors, at least one of the sectors not being associated with a channel of the received EM signals, the association of the channels to the sectors being configured to form an asymmetrical spectrum.

Example 18

The computer-readable storage media of example 13, wherein the instructions, when executed, further cause the processor of the radar system to: divide a Doppler-frequency spectrum of the received EM signals into the fourth number of sectors, the sectors representing a respective frequency range within the Doppler-frequency spectrum and being unequally sized within the Doppler-frequency spectrum; and associate each of the channels of the received EM signals to a respective sector of the sectors, the association of the channels to the unequal sectors being configured to form an asymmetrical spectrum.

Example 19

The computer-readable storage media of example 13, wherein the instructions, when executed, further cause the processor of the radar system to: divide a Doppler-frequency spectrum of the received EM signals into the fourth number of sectors, the sectors representing a respective frequency range within the Doppler-frequency spectrum, a subset of the sectors being equally sized within the Doppler-frequency spectrum and another subset of the sectors being unequally sized within the Doppler-frequency spectrum; and associate each of the channels of the received EM signals to a respective sector of the sectors, at least one of the sectors not being associated with a channel of the received EM signals, the association of the channels to the sectors being configured to form an asymmetrical spectrum.

Example 20

A method comprising: transmitting, via multiple transmitters of a radar system, electromagnetic (EM) signals in a frequency-division multiplexing (FDM) scheme; receiving, via multiple receivers of the radar system, EM signals reflected by one or more objects; and controlling multiple polyphase shifters to introduce a phase shift to at least one of the transmitted EM signals or the received EM signals, the multiple polyphase shifters being operably connected to the multiple transmitters, the multiple receivers, or a combination thereof, the introduced phase shift comprising one of at least three potential phase shifts.

Example 21

A radar system comprising: a first number of receivers configured to receive EM signals reflected by one or more objects, the EM signals being transmitted by a second number of transmitters in a frequency-division multiplexing (FDM) scheme, the second number being equal to or not equal to the first number, the received EM signals comprising a third number of channels, the third number being equal to a product of the first number and the second number, at least one of the transmitted EM signals or the received EM signals including phase shifts among the channels; and a processor configured to: divide a Doppler-frequency spectrum of the received EM signals into a fourth number of sectors, the sectors representing a respective frequency range within the Doppler-frequency spectrum, the fourth number being equal to or greater than the third number; associate each channel of the received EM signals to a respective sector of the sectors; perform, using at least one channel of the received EM signals, non-coherent integration on the received EM signals across the sectors; determine, based on the non-coherent integration, potential detections of the one or more objects, the potential detections including one or more actual detections and one or more aliased detections of the one or more objects; determine, based on the potential detections, the actual detections of the one or more objects; and determine, based on the actual detections, a Doppler frequency associated with each of the one or more objects.

Example 22

The radar system of example 21, wherein: the phase shifts are introduced by the first number of polyphase shifters operably connected to the receivers.

Example 23

The radar system of example 21, wherein: the phase shifts are introduced by the second number of polyphase shifters being operably connected to the transmitters.

Example 24

The radar system of example 21, wherein: the phase shifts are introduced by polyphase shifters operably connected to the receivers and the transmitters.

Example 25

The radar system of any of examples 21 through 24, wherein: the sectors are equally sized within the Doppler-frequency spectrum; the fourth number is equal to or greater than the third number plus one; and each of the channels of the received EM signals is associated with a respective sector of the sectors, at least one of the sectors not being associated with a channel of the received EM signals, the association of the channels to the sectors being configured to form an asymmetrical spectrum.

Example 26

The radar system of any of examples 21 through 24, wherein: the sectors are unequally sized within the Doppler-frequency spectrum; the fourth number is equal to the third number; and each of the channels of the received EM signals is associated with a respective sector of the sectors, the association of the channels to the unequal sectors being configured to form an asymmetrical spectrum.

Example 27

The radar system of any of examples 21 through 24, wherein: a subset of the sectors are equally sized within the Doppler-frequency spectrum and another subset of the sectors are unequally sized within the Doppler-frequency spectrum; the fourth number is equal to the third number; and each of the channels of the received EM signals is associated with a respective sector of the sectors, the association of the channels to the sectors being configured to form an asymmetrical spectrum.

Example 28

The radar system of any of examples 21 through 27, wherein the processor is further configured to: determine the potential detections of the one or more objects by: generating, using a constant-false-alarm-rate (CFAR) threshold, a first logical list of potential detections for a first channel of the third number of channels, the potential detections including one or more peaks within the received EM signals with EM energy greater than the CFAR threshold, the first logical list representing Doppler bins within the Doppler-frequency spectrum; and performing, based on the sectors, a particular number of circular shifts on the first logical list of potential detections to generate the particular number of additional logical lists of potential detections, the particular number being equal to the third number minus one; and determine the actual detections of the one or more objects by performing a logical AND operation on the first logical list and additional logical lists of potential detections at each Doppler bin of the logical lists.

Example 29

The radar system any of examples 21 through 27, wherein the processor is further configured to: determine the potential detections of the one or more objects by: generating a first EM spectrum of the received EM signals for a first channel of the third number of channels; performing, based on the sectors, a particular number of circular shifts on the first EM spectrum to generate the particular number of additional EM spectrums of the received EM signals, the particular number being equal to the third number minus one; and determining, across the first and additional EM spectrums, a minimum EM energy level at each Doppler bin of the EM spectrum; and determine the actual detections of the one or more objects by determining whether the minimum EM energy level at a respective Doppler bin is greater than a constant-false-alarm-rate (CFAR) threshold.

Example 30

The radar system of any of examples 21 through 27, wherein the processor is further configured to: determine the potential detections of the one or more objects by: generating a first EM spectrum of the received EM signals for a first channel of the third number of channels; performing, based on the sectors, a particular number of circular shifts on the first EM spectrum to generate the particular number of additional EM spectrums of the received EM signals, the particular number being equal to the third number minus one; determining, across the first and additional EM spectrums, a sum of EM energy levels at each Doppler bin of the EM spectrum; and generating, using a constant-false-alarm-rate (CFAR) threshold, a logical list of potential detections, the potential detections including one or more peaks within the sum of the EM energy levels with EM energy greater than the CFAR threshold, the logical list representing Doppler bins within the Doppler-frequency spectrum; and determine the actual detections of the one or more objects by identifying the one or more aliased detections based on the association of each of the channels of the received EM signals to the respective sector of the sectors.

Example 31

The radar system of example 25, wherein the processor is further configured to: determine the potential detections of the one or more objects by: generating a first EM spectrum of the received EM signals for a first channel of the third number of channels; and determining, using the first EM spectrum and for each sector of the fourth number of sectors, a sector-based integration of EM energy, the sector-based integration summing the EM energy of the respective sector and the EM energy of a particular number of successive sectors, the particular number being equal to the third number minus one; and determine the actual detections of the one or more objects by determining a maximum EM energy level for the sector-based integration of EM energy.

Example 32

The radar system of example 25, wherein the processor is further configured to: determine the potential detections of the one or more objects by: generating a first EM spectrum of the received EM signals for a first channel of the third number of channels; performing, based on the sectors, a particular number of circular shifts on the first EM spectrum to generate the particular number of additional EM spectrums of the received EM signals, the particular number being equal to the third number minus one; and determining, using the first and additional EM spectrums and for each sector of the fourth number of sectors, a sector-based integration of EM energy, the sector-based integration summing the EM energy of the respective sector across the first and additional EM spectrums; and determine the actual detections of the one or more objects by determining a maximum EM energy level for the sector-based integration of EM energy.

Example 33

The radar system of example 25, wherein the processor is further configured to: determine the potential detections of the one or more objects by: generating a first EM spectrum of the received EM signals for a first channel of the third number of channels; performing, based on the sectors, a particular number of circular shifts on the first EM spectrum to generate the particular number of additional EM spectrums of the received EM signals, the particular number being equal to the third number minus one; determining, using the first and additional EM spectrums and for each sector of the fourth number of sectors, a sector-based integration of EM energy, the sector-based integration summing the EM energy of the respective sector across the first and additional EM spectrums; determining, across the first and additional EM spectrums, a minimum EM energy level at each Doppler bin of the EM spectrum; generating, using a constant-false-alarm-rate (CFAR) threshold and the sector-based integration of EM energy, a first logical list of potential detections, the first logical list representing Doppler bins within the Doppler-frequency spectrum; and generating, using the CFAR threshold and the minimum EM energy level at each Doppler bin of the EM spectrum, a second logical list of potential detections; and determine the actual detections of the one or more objects by performing a logical AND operation on the first and second logical lists of potential detections at each Doppler bin.

Example 34

The radar system of any of examples 21 through 33, wherein the transmitters and the receivers operate as part of a multiple-input and multiple-output (MIMO) radar approach.

Example 35

The radar system of any of examples 21 through 34, wherein the radar system is configured to be installed on an automobile.

Example 36

A computer-readable storage media comprising computer-executable instructions that, when executed, cause a processor of a radar system to: receive, via a first number of receivers, EM signals reflected by one or more objects, the EM signals transmitted by a second number of transmitters in a frequency-division multiplexing (FDM) scheme, the second number being equal to or not equal to the first number, the received EM signals comprising a third number of channels, the third number being equal to a product of the first number and the second number, at least one of the transmitted EM signals or the received EM signals including phase shifts among the channels; divide a Doppler-frequency spectrum of the received EM signals into a fourth number of sectors, the sectors representing a respective frequency range within the Doppler-frequency spectrum, the fourth number being equal to or greater than the third number; associate each channel of the received EM signals to a respective sector of the sectors; perform, using at least one channel of the received EM signals, non-coherent integration on the received EM signals across the sectors; determine, based on the non-coherent integration, potential detections of the one or more objects, the potential detections including one or more actual detections and one or more aliased detections of the one or more objects; determine, based on the potential detections, the actual detections of the one or more objects; and determine, based on the actual detections, a Doppler frequency associated with each of the one or more objects.

Example 37

The computer-readable storage media of example 36, wherein: the sectors are equally sized within the Doppler-frequency spectrum; the fourth number is equal to or greater than the third number plus one; each of the channels of the received EM signals is associated with a respective sector of the sectors, at least one of the sectors not being associated with a channel of the received EM signals, the association of the channels to the sectors being configured to form an asymmetrical spectrum; and the computer-readable storage media comprises computer-executable instructions that, when executed, further cause the processor of a radar system to: determine the potential detections of the one or more objects by: generating a first EM spectrum of the received EM signals for a first channel of the third number of channels; and determining, using the first EM spectrum and for each sector of the fourth number of sectors, a sector-based integration of EM energy, the sector-based integration summing the EM energy of the respective sector and the EM energy of a particular number of successive sectors, the particular number being equal to the third number minus one; and determine the actual detections of the one or more objects by determining a maximum EM energy level for the sector-based integration of EM energy.

Example 38

The computer-readable storage media of example 36, wherein: the sectors are equally sized within the Doppler-frequency spectrum; the fourth number is equal to or greater than the third number plus one; each of the channels of the received EM signals is associated with a respective sector of the sectors, at least one of the sectors not being associated with a channel of the received EM signals, the association of the channels to the sectors being configured to form an asymmetrical spectrum; and the computer-readable storage media comprises computer-executable instructions that, when executed, further cause the processor of a radar system to: determine the potential detections of the one or more objects by: generating a first EM spectrum of the received EM signals for a first channel of the third number of channels; performing, based on the sectors, a particular number of circular shifts on the first EM spectrum to generate the particular number of additional EM spectrums of the received EM signals, the particular number being equal to the third number minus one; and determining, using the first and additional EM spectrums and for each sector of the fourth number of sectors, a sector-based integration of EM energy, the sector-based integration summing the EM energy of the respective sector across the first and additional EM spectrums; and determine the actual detections of the one or more objects by determining a maximum EM energy level for the sector-based integration of EM energy.

Example 39

The computer-readable storage media of example 36, wherein: the sectors are equally sized within the Doppler-frequency spectrum; the fourth number is equal to or greater than the third number plus one; each of the channels of the received EM signals is associated with a respective sector of the sectors, at least one of the sectors not being associated with a channel of the received EM signals, the association of the channels to the sectors being configured to form an asymmetrical spectrum; and the computer-readable storage media comprises computer-executable instructions that, when executed, further cause the processor of a radar system to: determine the potential detections of the one or more objects by: generating a first EM spectrum of the received EM signals for a first channel of the third number of channels; performing, based on the sectors, a particular number of circular shifts on the first EM spectrum to generate the particular number of additional EM spectrums of the received EM signals, the particular number being equal to the third number minus one; determining, using the first and additional EM spectrums and for each sector of the fourth number of sectors, a sector-based integration of EM energy, the sector-based integration summing the EM energy of the respective sector across the first and additional EM spectrums; determining, across the first and additional EM spectrums, a minimum EM energy level at each Doppler bin of the EM spectrum; generating, using a constant-false-alarm-rate (CFAR) threshold and the sector-based integration of EM energy, a first logical list of potential detections, the first logical list representing Doppler bins within the Doppler-frequency spectrum; and generating, using the CFAR threshold and the minimum EM energy level at each Doppler bin of the EM spectrum, a second logical list of potential detections; and determine the actual detections of the one or more objects by performing a logical AND operation on the first and second logical lists of potential detections at each Doppler bin.

Example 40

A method comprising: receiving, via a first number of receivers, EM signals reflected by one or more objects, the EM signals transmitted by a second number of transmitters in a frequency-division multiplexing (FDM) scheme, the second number being equal to or not equal to the first number, the received EM signals comprising a third number of channels, the third number being equal to a product of the first number and the second number, at least one of the transmitted EM signals or the received EM signals including phase shifts among the channels; dividing a Doppler-frequency spectrum of the received EM signals into a fourth number of sectors, the sectors representing a respective frequency range within the Doppler-frequency spectrum, the fourth number being equal to or greater than the third number; associating each channel of the received EM signals to a respective sector of the sectors; performing, using at least one channel of the received EM signals, non-coherent integration on the received EM signals across the sectors; determining, based on the non-coherent integration, potential detections of the one or more objects, the potential detections including one or more actual detections and one or more aliased detections of the one or more objects; determining, based on the potential detections, the actual detections of the one or more objects; and determining, based on the actual detections, a Doppler frequency associated with each of the one or more objects.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:
multiple transmitters configured to transmit electromagnetic (EM) signals in a frequency-division multiplexing (FDM) scheme, the multiple transmitters comprising a first number of transmitters;
multiple receivers configured to receive EM signals reflected by one or more objects, the multiple receivers further comprising a second number of receivers, the second number being equal or not equal to the first number;
multiple polyphase shifters operably connected to the multiple transmitters, the multiple receivers, or a combination thereof, the multiple polyphase shifters configured to introduce at least three potential non-zero phase shifts, the multiple polyphase shifters comprise a third number of polyphase shifters, the third number being equal to the first number, the second number, or a sum of the first number and the second number; and
a processor configured to control the multiple polyphase shifters to introduce at least three non-zero phase shifts to at least three of the transmitted EM signals or the received EM signals, the received EM signals comprise a fourth number of channels, the fourth number being equal to a product of the first number and the second number.

2. The radar system of claim 1, wherein:
the multiple polyphase shifters are operably connected to the multiple transmitters; and
the third number is equal to the first number.

3. The radar system of claim 1, wherein:
the multiple polyphase shifters are operably connected to the multiple receivers; and
the third number is equal to the second number.

4. The radar system of claim 1, wherein:
the multiple polyphase shifters are operably connected to the multiple transmitters and the multiple receivers; and
the third number is equal to the sum of the first number and the second number.

5. The radar system of claim 1, wherein the processor is further configured to:
divide a Doppler-frequency spectrum of the received EM signals into a fifth number of sectors, the sectors representing a respective frequency range within the Doppler-frequency spectrum and being equally sized within the Doppler-frequency spectrum, the fifth number being equal to or greater than the fourth number plus one; and
associate each of the channels of the received EM signals to a respective sector of the sectors, at least one of the sectors not being associated with a channel of the received EM signals, the association of the channels to the sectors being configured to form an asymmetrical spectrum.

6. The radar system of claim 1, wherein the processor is further configured to:
divide a Doppler-frequency spectrum of the received EM signals into the fourth number of sectors, the sectors representing a respective frequency range within the Doppler-frequency spectrum and being unequally sized within the Doppler-frequency spectrum; and associate each of the channels of the received EM signals to a respective sector of the sectors, the association of the channels to the unequal sectors being configured to form an asymmetrical spectrum.

7. The radar system of claim 1, wherein the processor is further configured to:
divide a Doppler-frequency spectrum of the received EM signals into the fourth number of sectors, the sectors representing a respective frequency range within the Doppler-frequency spectrum, a subset of the sectors being equally sized within the Doppler-frequency spectrum and another subset of the sectors being unequally sized within the Doppler-frequency spectrum; and
associate each of the channels of the received EM signals to a respective sector of the sectors, the association of the channels to the sectors being configured to form an asymmetrical spectrum.

8. The radar system of claim 1, wherein the processor is further configured to control the multiple polyphase shifters to dynamically adjust the at least three non-zero phase shifts introduced to the at least three of the transmitted EM signals or the received EM signals.

9. The radar system of claim 1, wherein the multiple transmitters and the multiple receivers are configured to operate as part of a multiple-input and multiple-output (MIMO) radar approach.

10. The radar system of claim 1, wherein the radar system is configured to be installed on an automobile.

11. A computer-readable storage media comprising computer-executable instructions that, when executed, cause a processor of a radar system to:
transmit, via multiple transmitters of the radar system, electromagnetic (EM) signals in a frequency-division multiplexing (FDM) scheme, the multiple transmitters comprise a first number of transmitters;
receive, via multiple receivers of the radar system, EM signals reflected by one or more objects, the multiple receivers comprise a second number of receivers, the second number being equal or not equal to the first number; and
control multiple polyphase shifters to introduce at least three non-zero phase shifts to at least three of the transmitted EM signals or the received EM signals, the multiple polyphase shifters being operably connected to the multiple transmitters, the multiple receivers, or a combination thereof, each of the introduced phase shifts comprising one of at least three potential non-zero phase shifts, the multiple polyphase shifters comprise a third number of polyphase shifters, the third number being equal to the first number, the second number, or a sum of the first number and the second number, the received EM signals comprise a fourth number of channels, the fourth number being equal to a product of the first number and the second number.

12. The computer-readable storage media of claim 11, wherein:
the multiple polyphase shifters are operably connected to the multiple transmitters; and
the third number is equal to the first number.

13. The computer-readable storage media of claim 11, wherein:
the multiple polyphase shifters are operably connected to the multiple receivers; and
the third number is equal to the second number.

14. The computer-readable storage media of claim 11, wherein:
the multiple polyphase shifters are operably connected to the multiple transmitters and the multiple receivers; and
the third number is equal to the sum of the first number and the second number.

15. The computer-readable storage media of claim 11, wherein the instructions, when executed, further cause the processor of the radar system to:
divide a Doppler-frequency spectrum of the received EM signals into a fifth number of sectors, the sectors representing a respective frequency range within the Doppler-frequency spectrum and being equally sized within the Doppler-frequency spectrum, the fifth number being equal to or greater than the fourth number plus one; and
associate each of the channels of the received EM signals to a respective sector of the sectors, at least one of the sectors not being associated with a channel of the received EM signals, the association of the channels to the sectors being configured to form an asymmetrical spectrum.

16. The computer-readable storage media of claim 11, wherein the instructions, when executed, further cause the processor of the radar system to:
divide a Doppler-frequency spectrum of the received EM signals into the fourth number of sectors, the sectors representing a respective frequency range within the Doppler-frequency spectrum and being unequally sized within the Doppler-frequency spectrum; and
associate each of the channels of the received EM signals to a respective sector of the sectors, the association of the channels to the unequal sectors being configured to form an asymmetrical spectrum.

17. The computer-readable storage media of claim 11, wherein the instructions, when executed, further cause the processor of the radar system to:
divide a Doppler-frequency spectrum of the received EM signals into the fourth number of sectors, the sectors representing a respective frequency range within the Doppler-frequency spectrum, a subset of the sectors being equally sized within the Doppler-frequency spectrum and another subset of the sectors being unequally sized within the Doppler-frequency spectrum; and
associate each of the channels of the received EM signals to a respective sector of the sectors, at least one of the sectors not being associated with a channel of the received EM signals, the association of the channels to the sectors being configured to form an asymmetrical spectrum.

18. A method comprising:
transmitting, via multiple transmitters of the radar system, electromagnetic (EM) signals in a frequency-division multiplexing (FDM) scheme, the multiple transmitters comprise a first number of transmitters;
receiving, via multiple receivers of the radar system, EM signals reflected by one or more objects, the multiple receivers comprise a second number of receivers, the second number being equal or not equal to the first number; and
controlling multiple polyphase shifters to introduce at least three non-zero phase shifts to at least three of the transmitted EM signals or the received EM signals, the multiple polyphase shifters being operably connected to the multiple transmitters, the multiple receivers, or a combination thereof, each of the introduced phase shifts comprising one of at least three potential non-zero phase shifts, the multiple polyphase shifters comprise a third number of polyphase shifters, the third number being equal to the first number, the second number, or a sum of the first number and the second number, the received EM signals comprise a fourth number of channels, the fourth number being equal to a product of the first number and the second number.

* * * * *